(12) United States Patent
Kashiwagi

(10) Patent No.: US 11,755,260 B2
(45) Date of Patent: Sep. 12, 2023

(54) PRINT SYSTEM, PRINTING APPARATUS AND INFORMATION PROCESSING APPARATUS, METHODS OF CONTROLLING THOSE, AND STORAGE MEDIUM

(71) Applicant: CANON KABUSHIKI KAISHA, Tokyo (JP)

(72) Inventor: Masaki Kashiwagi, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/669,468

(22) Filed: Feb. 11, 2022

(65) Prior Publication Data

US 2022/0269448 A1  Aug. 25, 2022

(30) Foreign Application Priority Data

Feb. 22, 2021 (JP) ................................. 2021-026644

(51) Int. Cl.
*G06F 3/12* (2006.01)

(52) U.S. Cl.
CPC .......... *G06F 3/1205* (2013.01); *G06F 3/1208* (2013.01); *G06F 3/1219* (2013.01); *G06F 3/1252* (2013.01)

(58) Field of Classification Search
CPC .... G06F 3/1205; G06F 3/1208; G06F 3/1219; G06F 3/1252; G06F 3/1256; G06F 3/1285
See application file for complete search history.

(56) References Cited

U.S. PATENT DOCUMENTS

| 2012/0212758 A1* | 8/2012 | Eom ..................... G06F 3/1204 358/1.13 |
| 2015/0015917 A1* | 1/2015 | Hirohata ............ G06K 15/1868 358/3.24 |
| 2015/0181050 A1* | 6/2015 | Nishii .................. H04N 1/0044 358/1.15 |
| 2015/0363138 A1* | 12/2015 | Inose ..................... G06F 3/1243 358/1.14 |
| 2016/0255222 A1* | 9/2016 | Sakata ............... H04N 1/00803 358/1.13 |
| 2019/0182396 A1* | 6/2019 | Kojima .............. H04N 1/00724 |

(Continued)

FOREIGN PATENT DOCUMENTS

| JP | 2013108770 A | 6/2013 |
| JP | 2016065875 A * | 4/2016 ............... G06K 9/00 |

*Primary Examiner* — Helen Zong
(74) *Attorney, Agent, or Firm* — ROSSI, KIMMS & McDOWELL LLP

(57) ABSTRACT

A print system comprising a printing apparatus, an information processing apparatus operable to input a job to the printing apparatus and thereby cause the printing apparatus to print and an inspection apparatus operable to receive sheets printed and discharged by the printing apparatus and inspect the sheets. The inspection apparatus compares the respective received sheets and a corresponding reference image among reference images registered in a predetermined order, and thereby inspects images of the respective sheets. The printing apparatus skips printing of a blank page in a case that a blank paper saving function is designated, and in a case of an inspection mode, performs a warning if the blank paper saving function is designated.

16 Claims, 18 Drawing Sheets

(56) References Cited

U.S. PATENT DOCUMENTS

| | | | |
|---|---|---|---|
| 2020/0210116 A1* | 7/2020 | Iwamoto | G06F 3/1205 |
| 2021/0365219 A1* | 11/2021 | Hidaka | G06F 3/1256 |
| 2021/0406621 A1* | 12/2021 | Shiraki | G06K 15/027 |
| 2022/0092758 A1* | 3/2022 | Tashiro | H04N 1/00047 |
| 2022/0300219 A1* | 9/2022 | Kitai | G06F 3/1253 |

* cited by examiner

FIG. 6

| INSPECTION RESULT | |
|---|---|
| DATE AND TIME | 3/6 10:10 |
| JOB NAME | INVOICE |
| NUMBER OF SHEETS TO INSPECT | 1000 |
| OK COUNT | 986 |
| NG COUNT | 14 |

601

PREVIOUS JOB  NEXT JOB
◁ 1/3 JOB NUMBER ▷   602

PLEASE SELECT JOB TO EXECUTE

801

| | JOB NAME | RECEIVED DATE/TIME |
|---|---|---|
| ✓ | INVOICE | 20xx/mm/dd |
| ✓ | QUOTATION | 20xx/mm/dd |
| ✓ | PAMPHLET | 20xx/mm/dd |
| ☐ | APPROVAL | 20xx/mm/dd |
| | | |
| | | |

802 — NEXT    803 — CANCEL

FIG. 8B

INSPECTION JOB SETTINGS

811

| | 812 | 813 | 815 |
|---|---|---|---|
| INVOICE | 300 COPIES | PRINT ONE COPY | FEED REFERENCE IMAGE FROM INSERTER |
| QUOTATION | 100 COPIES | PRINT ONE COPY | |
| PAMPHLET | 500 COPIES | PRINT ONE COPY | |

| DISCHARGE DESTINATION | LARGE-VOLUME STACKER | 814 |
| DISCHARGE DESTINATION WHEN NG | ESCAPE TRAY | |

816 — START PRINT    817 — CANCEL

PRINT SYSTEM, PRINTING APPARATUS AND INFORMATION PROCESSING APPARATUS, METHODS OF CONTROLLING THOSE, AND STORAGE MEDIUM

BACKGROUND OF THE INVENTION

Field of the Invention

The present invention relates to a print system, a printing apparatus, an information processing apparatus, methods of controlling those, and a storage medium.

Description of the Related Art

In recent years, there has been known a print system in which a sheet printed by a printing apparatus can be inspected by an inspection apparatus while the printed sheet is being conveyed. In the inspection of the printed sheet, the inspection apparatus reads an image of the conveyed printed sheet, and determines whether or not the printed sheet is normal by analyzing image data obtained by the reading. In this inspection, the result of the inspection is determined by comparing the image data obtained by reading the printed sheet with a reference image registered in the inspection apparatus. In order to perform such an inspection, the user registers a reference image to be used at the time of inspection to the inspection apparatus in advance. At the time of inputting an inspection job instructing the printing apparatus to print onto a sheet and inspect that printed sheet, the user selects a reference image corresponding to the inspection job to be inputted from reference images that have been registered in the inspection apparatus. The inspection apparatus can detect, for example, that a barcode or ruled line is missing, that an image is missing, that there is a printing defect, that a page is missing, that there is a color shift, and the like by the above inspection (see Japanese Patent Laid-Open No. 2013-108770).

Meanwhile, some printing apparatuses implement a function called blank paper saving. This function treats a page for which a page description language (hereinafter, PDL) does not contain an object such as a character or picture in the print data as a blank page, and does not print such a page.

However, if the blank paper saving function is performed by the printing apparatus when a plurality of images to be inspected in an inspection job are printed on sheets and inspected where the blank paper saving function has not been performed at the time of registration of the plurality of reference images corresponding to that plurality of images to be inspected, the order of the plurality of registered reference images and the order of a plurality of sheets printed by the printing apparatus in accordance with the inspection job will not match, resulting in inconsistency in the pages. There is a problem in that there are cases in which a printed sheet which actually should be determined to be OK in the inspection will be determined to be NG in the inspection when such inconsistency occurs.

SUMMARY OF THE INVENTION

An aspect of the present invention is to eliminate the above-mentioned problem with conventional technology.

A feature of the present invention is to provide a technique by which it is possible to suppress inconsistencies between print sheets and corresponding reference images in the inspection mode and to prevent wasteful defective products from being produced.

According to a first aspect of the present invention, there is provided a print system comprising a printing apparatus; an information processing apparatus operable to input a job to the printing apparatus and thereby cause the printing apparatus to print; and an inspection apparatus operable to receive sheets printed and discharged by the printing apparatus and inspect the sheets, the inspection apparatus comprising: one or more first processors and one or more first memories being configured to: in a case of an inspection mode for inspecting a sheet, compare the respective received sheets and a corresponding reference image among reference images registered in a predetermined order, and thereby inspect images of the respective sheets; and the printing apparatus comprising: one or more second processors and one or more second memories being configured to: skip printing of a blank page in a case that a blank paper saving function is designated; and in a case of the inspection mode, perform a warning if the blank paper saving function is designated.

According to a second aspect of the present invention, there is provided a printing apparatus capable of conveying a sheet printed in accordance with a job to an inspection apparatus and causing the inspection apparatus to inspect the sheet, the printing apparatus comprising: one or more processors and one or more memories being configured to: skip printing a printing of a blank page included in the job in a case that a blank paper saving function is designated; and in a case of an inspection mode for inspecting the sheet by using the inspection apparatus, perform a warning in a case that the blank paper saving mode is designated.

According to a third aspect of the present invention, there is provided an information processing apparatus operable to control a printing apparatus and an inspection apparatus for receiving a sheet printed and discharged by the printing apparatus and inspecting the sheet, the information processing apparatus comprising: one or more processors and one or more memories configured to: input a job to the printing apparatus and thereby cause the printing apparatus to print; skip printing of a blank page included in the job in a case where a blank paper saving function is designated; and perform a warning in a case that the blank paper saving function is designated when an inspection mode for inspecting printed sheets by using the inspection apparatus is designated.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 6 depicts a view illustrating an example of a screen for displaying inspection results in the inspection apparatus according to the first embodiment.

FIG. 8A is a diagram illustrating an example of a screen that is displayed on a display unit of the external controller according to the first embodiment and that allows a user to select inspection jobs to be executed.

FIG. 8B is a diagram illustrating an example of an inspection job setting screen that is displayed on the display unit of the external controller according to the first embodiment.

DESCRIPTION OF THE EMBODIMENTS

Embodiments of the present invention will be described hereinafter in detail, with reference to the accompanying drawings. It is to be understood that the following embodiments are not intended to limit the claims of the present invention, and that not all of the combinations of the aspects that are described according to the following embodiments are necessarily required with respect to the means to solve the problems according to the present invention. Note that in the explanation below, an external controller may also be referred to as an information processing apparatus, an image processing controller, a digital front end, a print server, a DFE, and the like. The image forming apparatus may be referred to as a multifunction device, a multifunction peripheral, an MFP, or the like.

Figure 1:
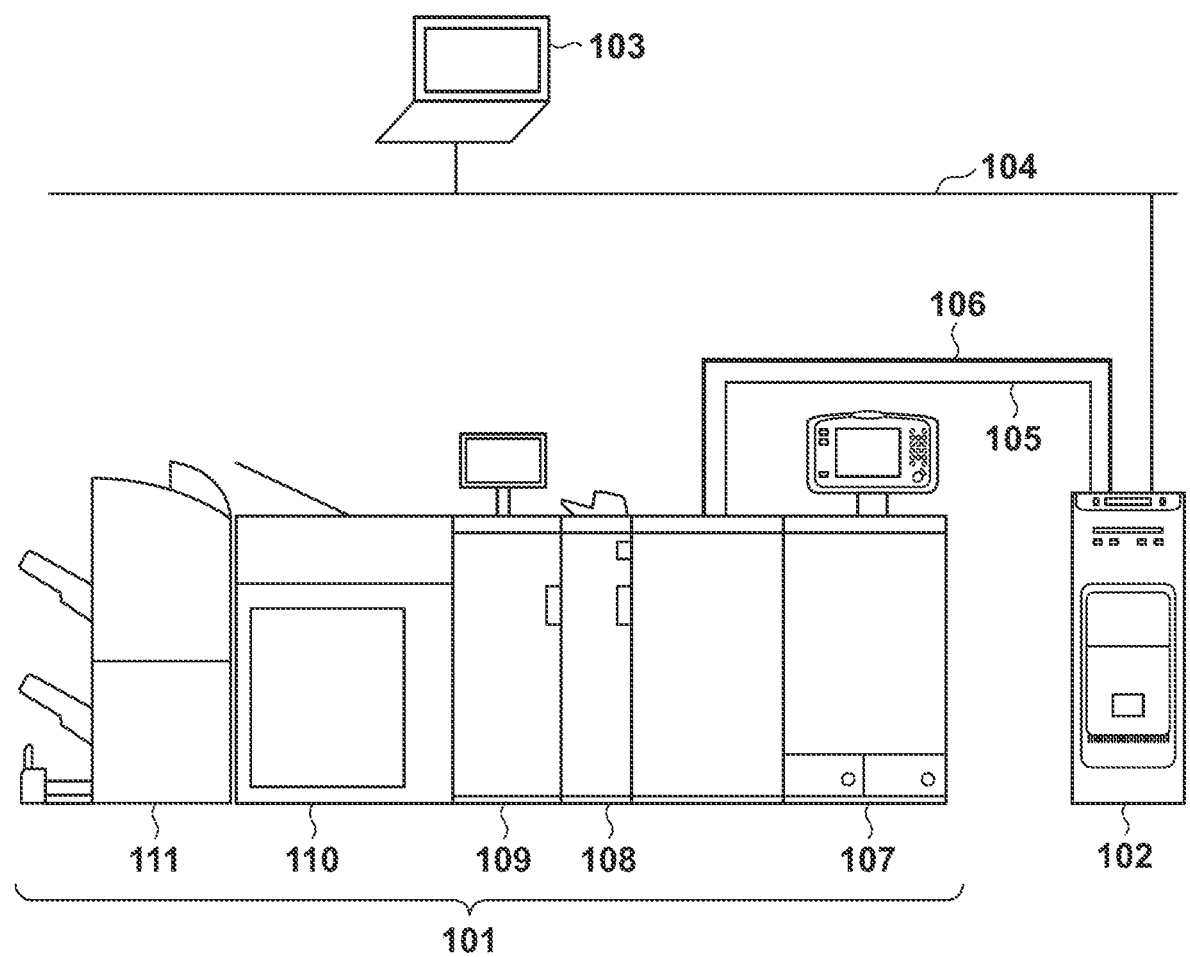
FIG. 1 is a diagram illustrating a configuration of a print system according to an embodiment of the present invention.

FIG. 1 is a diagram illustrating a configuration of a print system according to an embodiment of the present invention.

The print system includes an image forming apparatus 101 and an external controller 102. The image forming apparatus 101 and the external controller 102 are connected to each other via an internal LAN 105 and a video cable 106 so as to be able to communicate with each other. The external controller 102 is communicably connected to a client PC 103 (hereinafter, simply referred to as the PC 103) via an external LAN 104, and a print instruction is issued from the PC 103 to the external controller 102.

A printer driver having a function for converting print data into a page description language that can be processed by the external controller 102 is installed on the PC 103. The user who wants to perform printing can issue print instructions from various applications through the printer driver. The printer driver transmits print data to the external controller 102 based on a print instruction from a user. Upon receiving a print instruction from the PC 103, the external controller 102 performs data analysis and rasterization processing, and supplies print data to the image forming apparatus 101 to cause the image forming apparatus to perform a print job.

Next, the image forming apparatus 101 will be described. In the image forming apparatus 101, a plurality of apparatuses having different functions are connected and configuration is such that it is possible to perform a complicated process such as bookbinding.

A printing apparatus 107 uses toner to form (print) an image on a sheet (paper) conveyed from a feeding unit at the lower portion of the printing apparatus 107. The configuration and the operation principle of the printing apparatus 107 are as follows. A light beam such as a laser beam modulated according to image data is reflected by a rotating polygonal mirror such as a polygon mirror to irradiate a photosensitive drum as a scanning beam. An electrostatic latent image formed on the photosensitive drum by the laser beam is developed by using the toner, and the toner image is transferred to a sheet attached to a transfer drum. This series of image forming processes is sequentially performed for yellow (Y), magenta (M), cyan (C), and black (K) toners, whereby a full-color image is formed on the sheet. The sheet on the transfer drum, after the full-color image is thus formed thereon, is conveyed to a fixing unit. The fixing unit includes a roller, a belt, or the like, and a heat source such as a halogen heater is incorporated in the roller, and the toner on the sheet to which the toner image was transferred is dissolved by heat and pressure and thereby caused to be fixed to the sheet.

An inserter 108 inserts an insertion sheet between conveyed sheets. That is, the insertion sheet can be inserted at an arbitrary position in a group of sheets that were printed and conveyed by the printing apparatus 107. The inspection apparatus 109 reads an image of the conveyed sheet and compares it with a reference image registered in advance to determine whether or not the image printed on the sheet is normal. A large-volume stacker 110 is capable of stacking a large volume of sheets. A finisher 111 performs finishing processing on conveyed sheets. The finishing processing may be stapling, punching, saddle stitching, and the like, and a product subjected to the finishing processing is discharged to a discharge tray.

Although the print system illustrated in FIG. 1 has a configuration in which the external controller 102 is connected to the image forming apparatus 101, the present invention is not limited to a configuration in which the external controller 102 is connected. That is, the image forming apparatus 101 may be configured to be directly connected to the external LAN 104, and the PC 103 may transmit print data to the image forming apparatus 101 via the external LAN 104. In this case, data analysis and rasterization processing are performed in the image forming apparatus 101, and then the print processing is performed.

Figure 2:
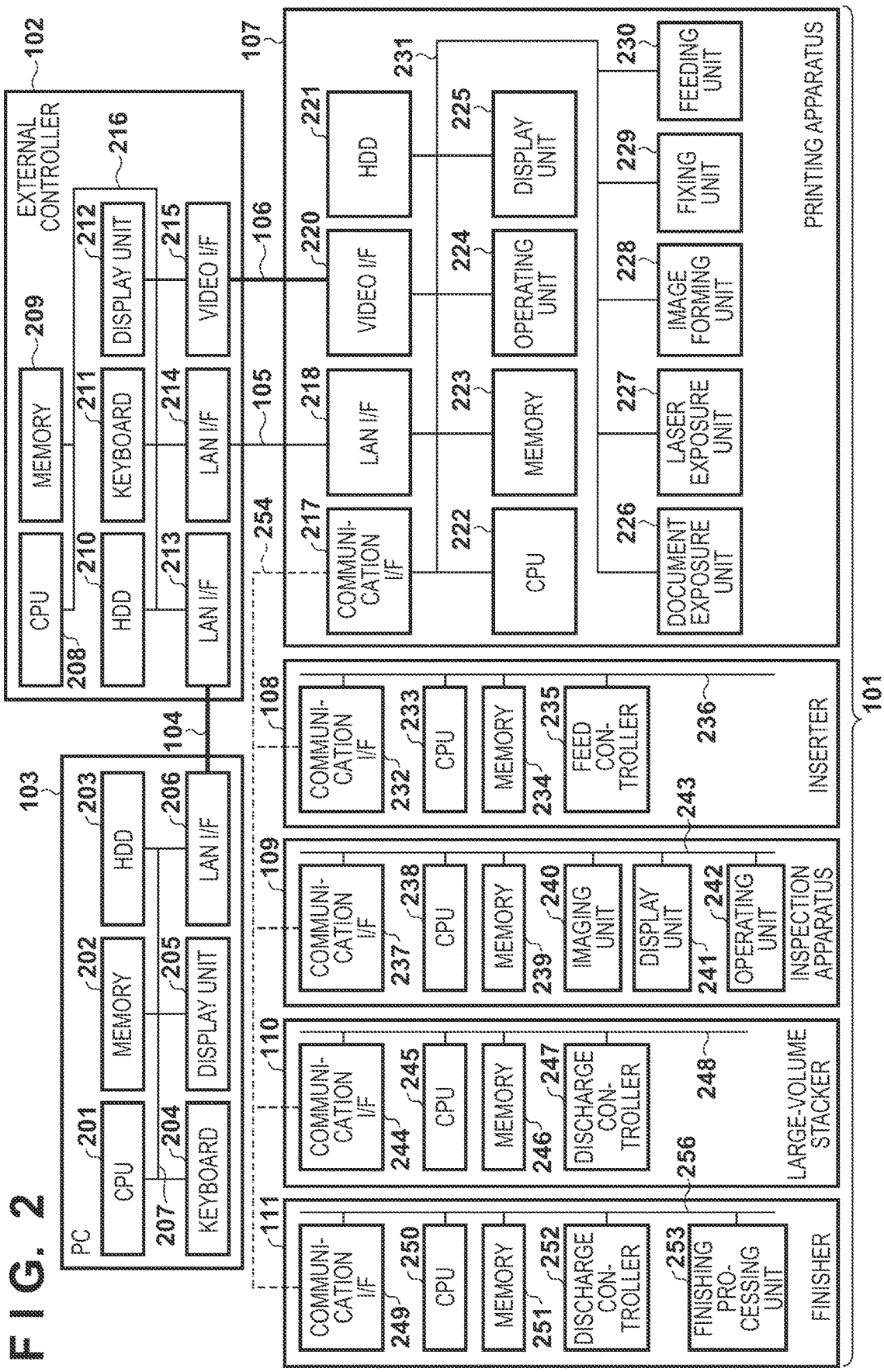
FIG. 2 is a block diagram for describing a configuration of an image forming apparatus, an external controller, and a PC according to the first embodiment.

FIG. 2 is a block diagram illustrating a configuration of the image forming apparatus 101, the external controller 102, and the PC 103 according to the embodiment.

First, a configuration of the printing apparatus 107 of the image forming apparatus 101 will be described.

The printing apparatus 107 of the image forming apparatus 101 includes a communication I/F 217, a LAN I/F 218, a video I/F 220, an HDD 221, a CPU 222, a memory 223, an operating unit 224, and a display unit 225. The printing apparatus 107 further includes a document exposure unit 226, a laser exposure unit 227, an image forming unit 228, a fixing unit 229, and a feeding unit 230. These components are connected via a system bus 231.

The communication I/F 217 is connected to the inserter 108, the inspection apparatus 109, the large-volume stacker 110, and the finisher 111 via a communication cable 254, and communication for controlling each of the apparatuses is performed. The LAN I/F 218 is connected to the external controller 102 via an internal LAN 105 and performs communication with the external controller 102 to receive a print instruction and the like. The video I/F 220 is connected to the external controller 102 via a video cable 106 and performs communication with the external controller 102 to receive print data and the like.

The HDD 221 is a storage device for storing programs and data. The CPU 222 executes a boot program stored in the memory 223, deploys a program stored in the HDD 221 into the memory 223, executes the deployed program, and thereby comprehensively performs control such as image processing control and printing. The memory 223 includes a ROM for storing a boot program and the like and a RAM used for deploying programs and the like, and the memory 223 is used for storing programs, image data, and the like required when the CPU 222 performs various kinds of processing. The memory 223 also provides a work area for storing various data when the CPU 222 performs control. The operating unit 224 receives input of various settings and operation instructions from a user. The display unit 225 displays setting information of the image forming apparatus 101, a print job processing status, and the like. Note that the display unit 225 may be provided with a touch panel function, and the display unit 225 may perform some of the functions of the operating unit 224.

The document exposure unit 226 performs a process of reading a document when a copy function or a scan function is used. The document exposure unit 226 obtains image data of an image by irradiating light from an exposure lamp to a sheet placed by a user or a conveyed sheet and capturing an image by a CMOS image sensor. The laser exposure unit 227 performs primary charging and laser exposure for irradiating the photosensitive drum with a laser beam in order to transfer the toner image. The laser exposure unit 227 first executes primary charging in which the surface of the photosensitive drum is charged to a uniform negative potential. Next, a laser beam emitted by driving a semiconductor laser by a laser driver is irradiated on the photosensitive drum while adjusting a reflection angle by a polygon mirror. As a result, negative electric charges of the irradiated portion are neutralized, and an electrostatic latent image corresponding to the image data is formed thereon. The image forming unit 228 is an apparatus for transferring a toner image to a sheet, and the image forming unit 228 includes a developing unit, a transfer unit, a toner replenishment unit, and the like, and transfers a toner image on the photosensitive drum to the sheet. The developing unit visualizes negatively charged toner from a developing cylinder as a toner image by causing the toner to attach to the electrostatic latent image on the surface of the photosensitive drum. The transfer unit performs a primary transfer in which a positive potential is applied to a primary transfer roller to transfer a toner image on the surface of the photosensitive drum to a transfer belt, and a secondary transfer in which a positive potential is applied to a secondary transfer roller to transfer the toner image on the transfer belt to the sheet. The fixing unit 229 melts and fixes the toner image on the sheet to the sheet by heat and pressure. The fixing unit 229 includes a heater, a fixing belt, a pressure belt, and the like. The feeding unit 230 is a device for feeding a sheet, and a sheet feeding operation and conveying operation are controlled by rollers and various sensors.

Next, a configuration of the inserter 108 of the image forming apparatus 101 will be described.

The inserter 108 of the image forming apparatus 101 has a communication I/F 232, a CPU 233, a memory 234, and a feed controller 235, and these components are connected via a system bus 236. The communication I/F 232 is connected to the printing apparatus 107 via the communication cable 254, and communication required for control is performed with the printing apparatus 107. The CPU 233 performs various control required for feeding sheets in accordance with a control program stored in the memory 234. The memory 234 is a storage device in which a control program is stored. The feed controller 235 controls a feeding unit of the inserter 108 and feeding and conveyance of a sheet conveyed from the printing apparatus 107, while controlling a roller and a sensor, based on an instruction from the CPU 233.

Next, a configuration of the inspection apparatus 109 of the image forming apparatus 101 will be described.

The inspection apparatus 109 of the image forming apparatus 101 includes a communication I/F 237, a CPU 238, a memory 239, an imaging unit 240, a display unit 241, and an operating unit 242, and these components are connected via a system bus 243. The communication I/F 237 is connected to the printing apparatus 107 via the communication cable 254, and communication required for control is performed with the printing apparatus 107. The CPU 238 performs various control required for inspection in accordance with a control program stored in the memory 239. The memory 239 is a storage device in which a control program or the like is stored. The imaging unit 240 captures an image of a conveyed sheet based on an instruction from the CPU 238. The imaging unit 240 reads not only printed matter (sheet) to be inspected but also printed matter (sheet) serving as a reference image candidate at the time of registration of the reference image. A plurality of sheets on which images serving as reference image candidates are printed are read, and the image data obtained by the reading is superimposed and averaged, and the result is used as a reference image. This makes it possible to eliminate as much as possible minute fluctuation components that are included in image data obtained by imaging the printed sheet and are too small for the inspection accuracy.

At the time of inspection, the CPU 238 compares image data obtained by imaging, by the imaging unit 240, the sheet to be inspected with a reference image stored in the memory 239, and determines whether or not the image printed on the sheet to be inspected is normal. The display unit 241 is used for displaying inspection results, setting screens, and the like. The operating unit 242 is operated by the user and receives instructions to change a setting of the inspection apparatus 109, to register a reference image, or the like. Note that the display unit 241 may be provided with a touch panel function, and the display unit 241 may perform some of the functions of the operating unit 242.

Next, a configuration of the large-volume stacker 110 of the image forming apparatus 101 will be described.

The large-volume stacker 110 of the image forming apparatus 101 has a communication I/F 244, a CPU 245, a memory 246, and a discharge controller 247, and these components are connected via a system bus 248. The communication I/F 244 is connected to the printing apparatus 107 via the communication cable 254, and communication required for control is performed with the printing apparatus 107. The CPU 245 performs various control required for discharge in accordance with a control program stored in the memory 246. Also, the memory 246 is a storage device in which a control program or the like is stored. A discharge controller 247 performs control to convey a conveyed sheet to a stack tray, an escape tray, or the subsequent finisher 111 based on an instruction from the CPU 245.

Next, a configuration of the finisher 111 of the image forming apparatus 101 will be described.

The finisher 111 of the image forming apparatus 101 includes a communication I/F 249, a CPU 250, a memory 251, a discharge controller 252, and a finishing processor 253, and these components are connected via a system bus 256. The communication I/F 249 is connected to the printing apparatus 107 via the communication cable 254, and communication required for control is performed with the printing apparatus 107. The CPU 250 performs various control required for finishing and discharge in accordance with a control program stored in the memory 251. The memory 251 is a storage device in which the control program or the like is stored. The discharge controller 252 controls conveyance and discharge of sheets based on an instruction from the CPU 250. The finishing processor 253 controls finishing processing such as stapling, punching, saddle stitching, and the like based on an instruction from the CPU 250.

Next, a configuration of the external controller 102 will be described.

The external controller 102 includes a CPU 208, a memory 209, an HDD 210, a keyboard 211, a display unit 212, a LAN I/F 213, a LAN I/F 214, and a video I/F 215, which are connected via a system bus 216. The CPU 208 comprehensively executes processing such as receiving print data from the PC 103, Raster Image Processing (RIP), and transmitting print data to the image forming apparatus 101 by deploying a program stored in the HDD 210 to the memory 209 and executing the deployed program. The memory 209 stores programs and data necessary when the CPU 208 performs various kinds of processing, and provides a work area for storing various data during control processing by the CPU 208. The HDD 210 stores programs, data, and the like required for operations such as print processing. The keyboard 211 is a device for inputting operating instructions of the external controller 102. Information such as an execution application of the external controller 102 is displayed on the display unit 212 in accordance with a video signal of a still image or a moving image. The LAN I/F 213 is connected to the PC 103 via the external LAN 104 and receives print instructions and the like from the PC 103. The LAN I/F 214 is connected to the image forming apparatus 101 via the internal LAN 105, and performs communication for giving a print instruction or the like to the image forming apparatus 101. The video I/F 215 is connected to the image forming apparatus 101 via the video cable 106, and transmits print data or the like to the image forming apparatus 101.

Next, the configuration of the PC 103 will be described.

The PC 103 includes a CPU 201, a memory 202, an HDD 203, a keyboard 204, a display unit 205, and a LAN I/F 206, which are connected via a system bus 207. The CPU 201 executes a boot program of the memory 202, deploys a document processing program or the like stored in the HDD 203 into the memory 202, executes the deployed program, and thereby performs print data generation and a print instruction. The CPU 201 also comprehensively controls each of the devices connected to the system bus 207. The memory 202 includes a ROM for storing a boot program and various data and a RAM for providing a deployment region for programs, and stores programs and various data required when the CPU 201 performs various processing. Also, the RAM provides a work area for storing various data when the CPU 201 performs various processing. The HDD 203 stores programs, data, and the like required for operations such as print processing. The keyboard 204 provides a user interface for a user to enter operating instructions to the PC 103. Information of an execution application of the PC 103 or the like is displayed on the display unit 205 as well as a still image or a moving image video signal. The display unit 205 may have a touch panel function to provide a user interface function. The LAN I/F 206 is connected to the external LAN 104 and performs communication with the external controller 102 to make a print instruction or the like via the external LAN 104.

In the above description, the external controller 102 and the image forming apparatus 101 are connected to each other by the internal LAN 105 and the video cable 106, but configuration may be such that the external controller 102 and the image forming apparatus 101 transmit and receive data necessary for printing, and the external controller 102 and the image forming apparatus 101 may be connected by only a video cable, for example. In addition, the memory 202, the memory 209, the memory 223, the memory 234, the memory 239, the memory 246, and the memory 251 each may be a storage device for holding data and programs. For example, configuration may be such that the memory 202, the memory 209, the memory 223, the memory 234, the memory 239, the memory 246, and the memory 251 are replaced by a volatile RAM, a non-volatile ROM, a built-in HDD, an external HDD, a USB memory, or the like.

Figure 3:
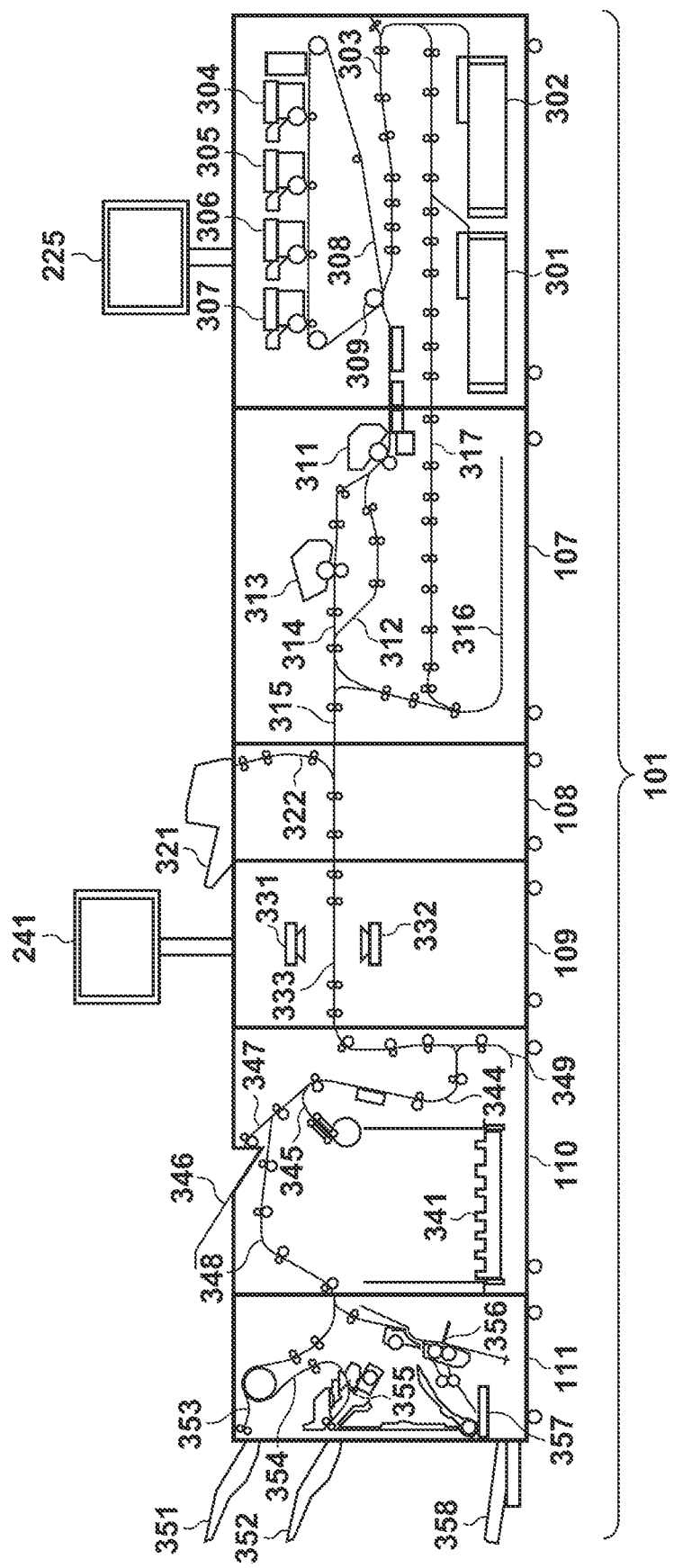
FIG. 3 depicts a schematic cross-sectional view illustrating a mechanism of the image forming apparatus according to the first embodiment.

FIG. 3 depicts a schematic cross-sectional view illustrating a mechanism of the image forming apparatus 101 according to the embodiment.

Paper feed decks 301 and 302 can each accommodate a plurality of various types of sheets stacked therein. Each sheet feeding deck separates only the uppermost sheet of the accommodated sheets and conveys it to a sheet conveyance path 303. Developing stations 304 to 307 form toner images using colored toners of Y, M, C, and K, respectively, to form color images. The toner images thus formed are primary transferred onto an intermediate transfer belt 308. The intermediate transfer belt 308 rotates in the clockwise direction in the drawing, and the toner image (color image) is transferred onto the sheet conveyed from the sheet conveyance path 303 at a secondary transfer position 309. The display unit 225 is used to display information about a printing status and settings of the image forming apparatus 101. A fixing unit 311 fixes the toner image to the sheet. The fixing unit 311 includes a pressure roller and a heating roller, and the toner image is fixed to the sheet by melting and pressure bonding the toner by passing the sheets between the rollers. A sheet, after having passed through the fixing unit 311, is conveyed to a conveyance path 315 through a sheet conveyance path 312. If further melting and pressure bonding is required for fixing the toner image depending on the type of the sheet, a sheet, after having passed through the fixing unit 311, is conveyed to the second fixing unit 313 using an upper sheet conveyance path, and after additional melting and pressure bonding are performed, the sheet is conveyed to the conveyance path 315 through the sheet conveyance path 314. When an image forming mode is for a double-sided printing, the sheet, for which fixing has been completed, is conveyed to a sheet reversing path 316, the sheet is reversed by the reversing path 316, and then the sheet is conveyed to a double-sided conveying path 317, and the toner image is transferred to the second side of the sheet at the secondary transfer position 309.

The inserter 108 includes an inserter tray 321, and merges sheets fed through a sheet conveyance path 322 into the conveyance path. This makes it possible to insert a sheet at an arbitrary position into a series of sheet groups conveyed from the printing apparatus 107 and convey the sheets to a subsequent apparatus.

The sheet having passed through the inserter 108 is conveyed to the inspection apparatus 109. CISs (Contact Image Sensor) 331 and 332 are disposed in the inspection apparatus 109 so as to face each other. The CIS 331 is a sensor for reading the top surface of the sheet that has been conveyed, and the CIS 332 is a sensor for reading the bottom surface of the sheet. Note that the image sensor for reading may be a line scan camera rather than a CIS. The inspection apparatus 109 reads an image of a sheet by using the CISs 331 and 332 when the sheet conveyed on the sheet conveyance path 333 reaches a predetermined position, and the inspection apparatus 109 determines whether the image printed on the sheet is normal. The display unit 241 displays the result of the inspection performed by the inspection apparatus 109 or the like.

A large-volume stacker 110 is capable of stacking a large volume of sheets. The large-volume stacker 110 has a stack tray 341 as a tray for stacking sheets. A sheet that has passed through the inspection apparatus 109 is inputted into the large-volume stacker 110 through the sheet conveyance path 344. Sheets are stacked on the stack tray 341 from the sheet conveyance path 344 through the sheet conveyance path 345. The stacker 110 further includes an escape tray 346 as a discharge tray. The escape tray 346 is a discharge tray for discharging a sheet determined to be a defective sheet by the inspection apparatus 109. When the sheet is discharged to the escape tray 346, the sheet is conveyed from the sheet conveyance path 344 to the escape tray 346 via the sheet conveyance path 347. Note that in the case of transporting the sheet to the finisher 111 at a subsequent stage of the large-volume stacker 110, the sheet is transported through the sheet conveyance path 348. A reversing unit 349 is a reversing unit for reversing sheets. The reversing unit 349 is used in the case of stacking sheets on the stack tray 341. A sheet is reversed once by the reversing unit 349 when stacked onto the stack tray 341 so that an orientation of the inputted sheet and an orientation of the sheet at the time of output will be the same. Since the sheet is discharged as it is without being flipped at the time of stacking when a sheet is transported to the escape tray 346 or the subsequent finisher 111, the inverting operation in the reversing unit 349 is not performed.

The finisher 111 performs a finishing process on the conveyed sheet in accordance with a function specified by the user. Specifically, the finisher 111 has a finishing function such as stapling (binding at one or two locations), punching (two holes or three holes), saddle stitch bookbinding, or the like. The finisher 111 has two discharge trays 351 and 352, and the sheet is discharged to the discharge tray 351 via a sheet conveyance path 353. However, finishing processing such as stapling cannot be performed in the sheet conveyance path 353. When finishing processing such as stapling is performed, the sheets are sent to the processing unit 355 via the sheet conveyance path 354, where the finishing processing specified by the user is executed, and then a bundle of the processed sheets is discharged to the discharge tray 352. The discharge trays 351 and 352 can each be moved up and down, and the discharge tray 351 can be moved down so that sheets subjected to finishing processing by the processing unit 355 can be stacked on the discharge tray 351. When saddle stitch bookbinding is designated, the saddle-stitch processing unit 356 performs stapling processing on the center of the sheets, and then folds the sheets in two and discharges the sheets to the saddle stitch bookbinding tray 358 via the sheet conveyance path 357. The saddle stitch bookbinding tray 358 has a conveyor-belt configuration, and configuration is such that a saddle stitch bookbinding bundle stacked on the saddle stitch bookbinding tray 358 is conveyed to the left side of FIG. 3.

First Embodiment

The first embodiment of the present invention will be described based on the system configuration and the device configuration described above. FIGS. 4A to 7B are diagrams illustrating examples of screens displayed on the display unit 241 of the inspection apparatus 109 according to the first embodiment. These screens are displayed based on an instruction of the CPU 238 of the inspection apparatus 109.

The inspection apparatus 109 inspects an image of a sheet that has been sent thereto, in accordance with a preset inspection item. The image inspection is performed by comparing a preset reference image with image data obtained by reading the conveyed sheet. Methods for comparing images include a method of comparing pixel values for each image position, a method of comparing positions of objects by detecting edges, and a method of extracting character data by OCR (Optical Character Recognition), and the like. The inspection item may be misregistration in the printing position, a tint of the image, a density of the image, streaking, blurring, print omission or the like.

Figure 4A:
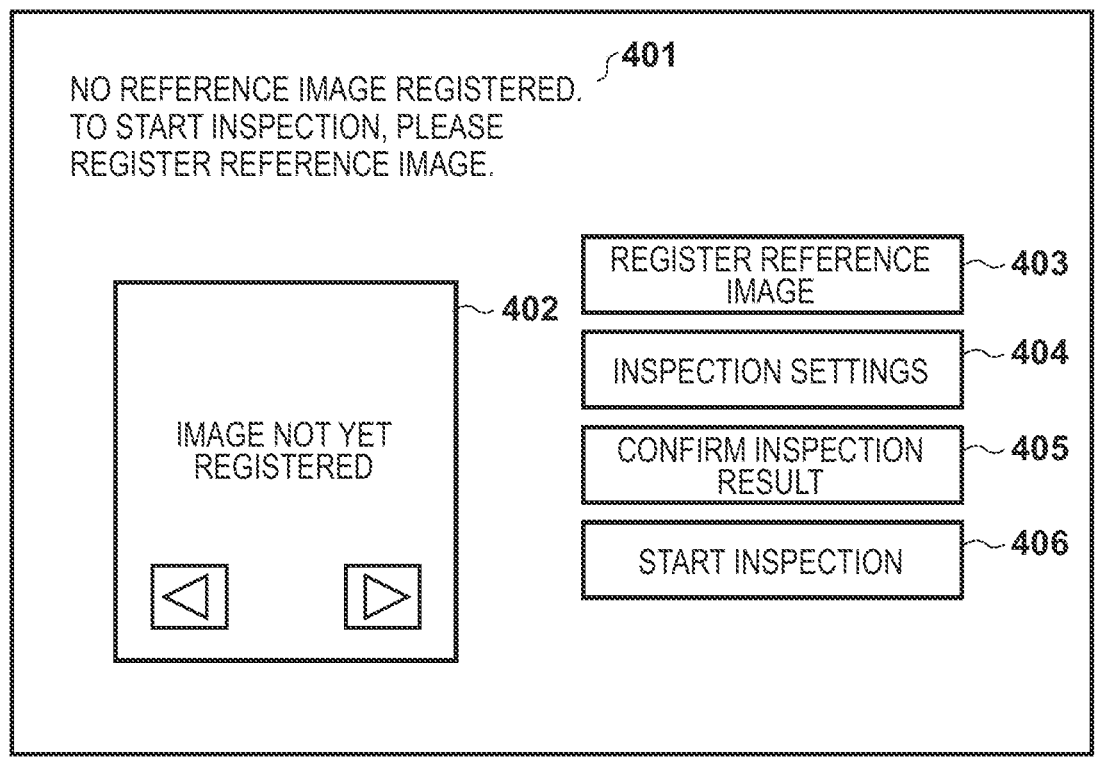
FIG. 4A is a diagram illustrating an example of a screen displayed on a display unit of an inspection apparatus according to the first embodiment when the inspection apparatus is started.

FIG. 4A is a diagram illustrating an example of a screen displayed on the display unit 241 of the inspection apparatus 109 according to the first embodiment when the inspection apparatus 109 starts up.

A message 401 displays that since a reference image has not been registered, registration of a reference image is necessary in order to start inspection. When there is a registered reference image, the reference image is displayed in an area 402. Since a reference image has not yet been registered in FIG. 4A, "reference image is not yet registered" indicating that a reference image has not yet been registered is displayed. A display in a case where a reference image has been registered will be described later.

A reference image registration button 403 is a button for invoking a registration screen for registering a reference image. A reference image is an image to be compared with an image read by the inspection apparatus 109, and an image of the sheet that is determined in advance to be normal by visual observation or by the inspection apparatus 109 is registered as a reference image. An inspection setting button 404 is a button for invoking an inspection setting screen. With this button 404, the user sets an inspection item, an inspection accuracy (a degree of difference from the reference image at which to determine an image to be defective image), and the like in accordance with inspection objectives. An inspection result confirmation button 405 is a button for invoking an inspection result confirmation screen. This confirmation screen allows the user to confirm past inspection content and inspection results. An inspection start button 406 is a button for instructing inspection to be started. When the start button 406 is pressed, the inspection apparatus 109 transitions into an inspection mode, and notifies the printing apparatus 107 that the inspection mode has been set. When the inspection is started, the inspection apparatus 109 starts an inspection of a sheet image sent thereto.

Figure 4B:
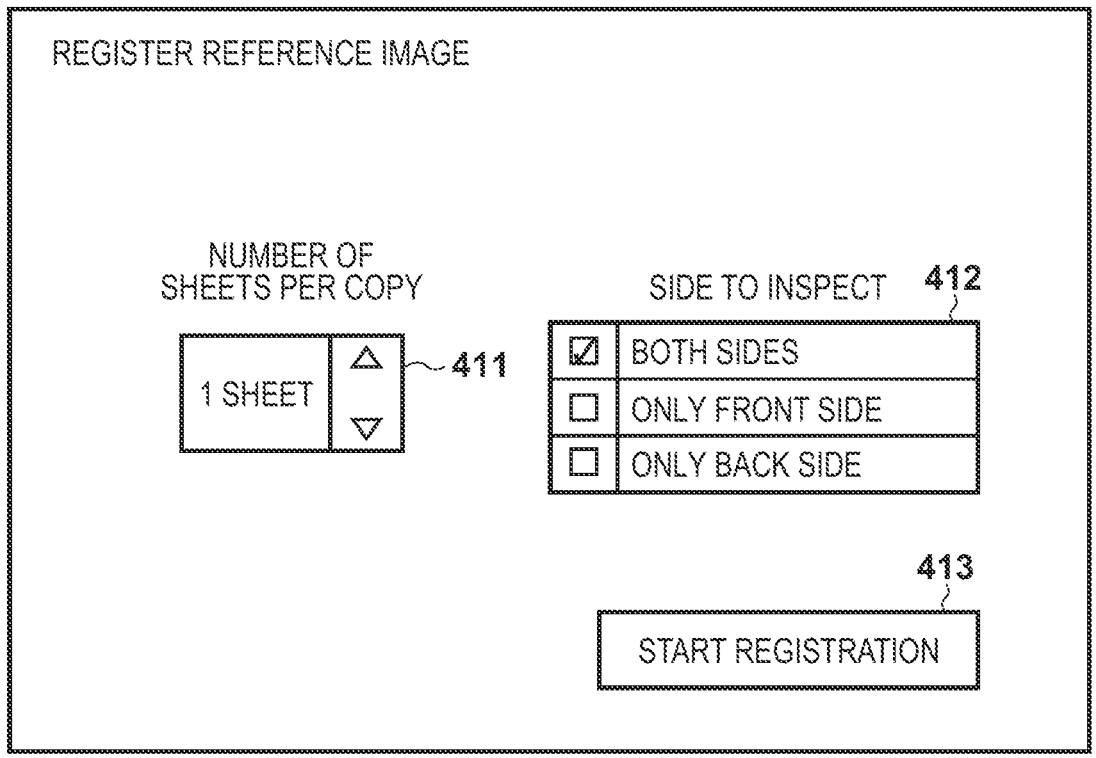
FIG. 4B is a diagram illustrating an example of a screen displayed on the display unit of the inspection apparatus according to the first embodiment when a reference image is registered to the inspection apparatus.

FIG. 4B is a diagram illustrating an example of a screen displayed on the display unit 241 of the inspection apparatus 109 according to the first embodiment when a reference image is to be registered to the inspection apparatus 109. The screen of FIG. 4B is displayed by pressing the registration button 403 of the reference image of FIG. 4A.

Here, the inspection apparatus 109 can register reference images by reading a group of sheets on which the reference images have been printed in units of copies. A number of sheets per copy 411 is a setting unit for setting the number of sheets per copy of a print job for performing an inspection. The inspection apparatus 109 can input a print job for printing two or more sheets per copy and register an image of a plurality of sheets included in the copy as a reference image. A side to inspect 412 is a setting unit for setting a sheet side on which inspection is to be performed. It is possible to set whether the inspection performed by the inspection apparatus 109 is to be performed on both sides of the sheet, only on the front side, or only on the back side. In FIG. 4B, "both sides" is selected. Note that even if an image is printed on only one side of a sheet, both sides of the sheet may be set to be inspected in order to inspect that no dust is present on the side on which printing has not been performed. A registration start button 413 is a button for instructing registration of a reference image to be started. When the button 413 is pressed, the inspection apparatus 109 transitions into a reference image registration mode, and notifies the printing apparatus 107 that the reference image registration mode is set. Then, when the reference image registration mode is transitioned into, the inspection apparatus 109 reads images of a plurality of conveyed print sheets in units of copies. The inspection apparatus 109 stores a plurality of items of image data obtained by reading the sheets as reference images in association with a barcode image of a reference image switching sheet to be described later.

Figure 5A:
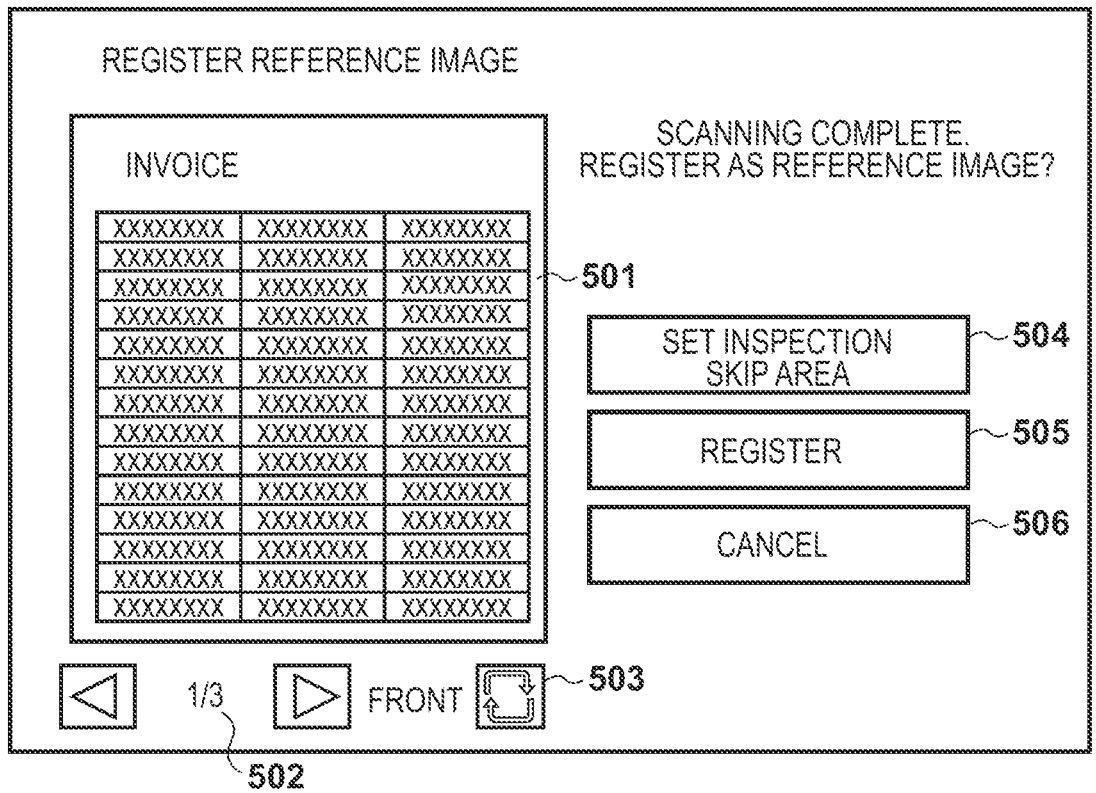
FIG. 5A is a diagram illustrating an example of a screen displayed on the display unit of the inspection apparatus according to the first embodiment after reading of the reference image is completed in the inspection apparatus.

FIG. 5A is a diagram illustrating an example of a screen displayed on the display unit 241 of the inspection apparatus 109 according to the first embodiment after reading of reference image has been completed in the inspection apparatus 109.

An image of a print sheet read by the inspection apparatus 109 is displayed in a display area 501. When a plurality of sheets are read, the displayed image can be switched to an image of another sheet by using a switching button 502. When front and back images are to be registered, the front and back images can be switched by a switching button 503. A "set inspection skip area" button 504 is a button for instructing the setting of an inspection skip area. With this button 504, it is possible to set an area in which inspection is not performed for a case in which printing content of a specific area changes in each copy, such as with variable printing (VDP, Variable Data Printing), or the like. For example, there are cases where only an address and a name change in each copy when a different ID is printed for each copy. A registration button 505 is a button by which a user instructs that an image be registered as a reference image after confirming the read image of the display area 501. When the registration button 505 is pressed, the inspection apparatus 109 registers the image displayed in the display area 501 as a reference image, and then returns to the original screen. In this case, in the screen illustrated in FIG. 4A, the message 401 is changed to "reference image has been registered", and the reference image is displayed in the display area 402. A cancel button 506 is a button for canceling the registration of the reference image. When the cancel button 506 is pressed, the inspection apparatus 109 returns to the display screen of FIG. 4A without registering a reference image. When the registration button 505 or the cancel button 506 is pressed and the original screen is returned to, the inspection apparatus 109 transitions from the reference image registration mode to a normal mode, and notifies the printing apparatus 107 that the normal mode is set.

Figure 5B:
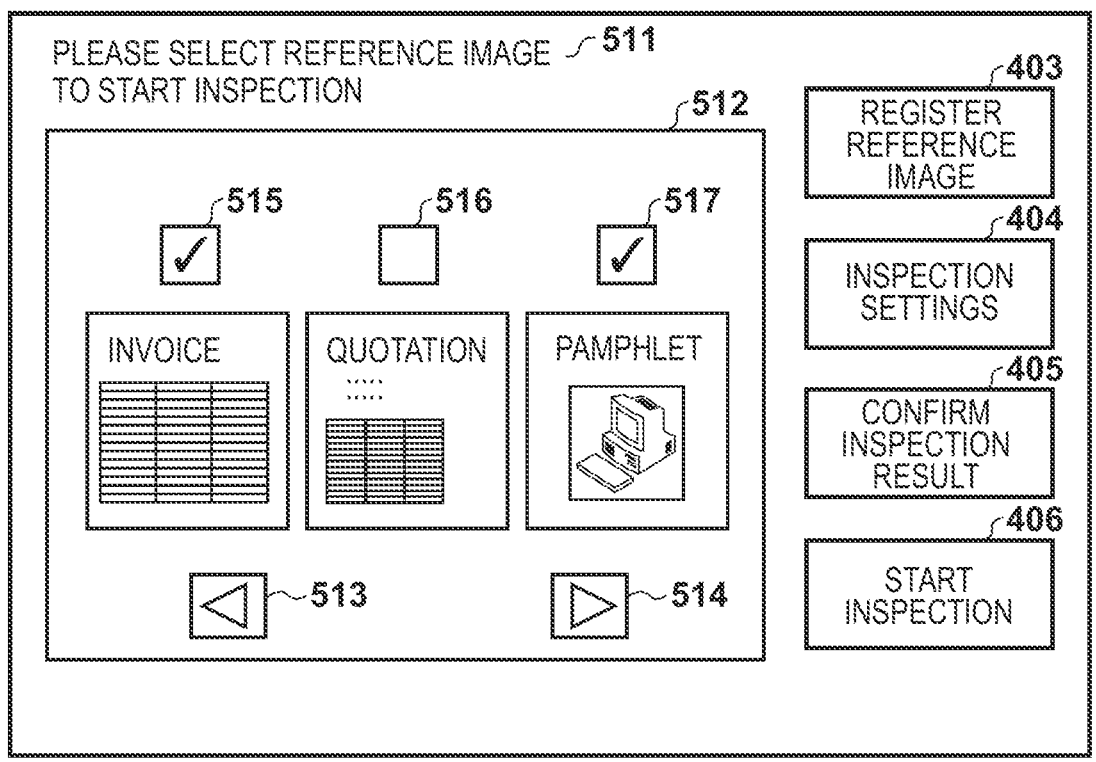
FIG. 5B is a diagram illustrating an example of a home screen displayed on the display unit of the inspection apparatus according to the first embodiment in a case where a plurality of reference images are registered to the inspection apparatus.

FIG. 5B is a diagram illustrating an example of a home screen displayed on the display unit 241 of the inspection apparatus 109 according to the first embodiment in a case where a plurality of reference images have been registered in the inspection apparatus 109. Note that in FIG. 5B, parts common to FIG. 4A are denoted by the same reference numerals.

A message 511 prompts selection of a reference image to be used for inspection from a plurality of registered reference images. In a display area 512, a plurality of registered reference images are displayed. Scroll buttons 513 and 514 are buttons for scrolling the screen left and right in order to select a reference image not on the screen. Check boxes 515 to 517 correspond to each reference image and are used to select the reference image for use in inspecting a corresponding image. An image corresponding to the checked box is selected as a reference image to be used for inspection. When the inspection start button 406 is pressed after the reference image has been selected, an inspection process using the selected reference image is started.

FIG. 6 is a diagram illustrating an example of a screen for displaying an inspection result in the inspection apparatus 109 according to the first embodiment. The screen of FIG.

6 is displayed upon the inspection result confirmation button 405 being pressed in the screen of FIG. 4A.

A display area 601 displays general attributes of a job that has been inspected and inspection results. A job selection 602 is for selecting a job for which to display an inspection result. In the example of FIG. 6, the inspection results for the first job (1/3) among three jobs for which history is stored is indicated as being displayed. The job to be displayed can be switched by operating the left and right buttons of the job selection 602. An OK button 603 is a button for instructing completion of confirmation of the inspection results. When the OK button 603 is pressed, the screen of FIG. 4A is returned to.

Figure 7A:
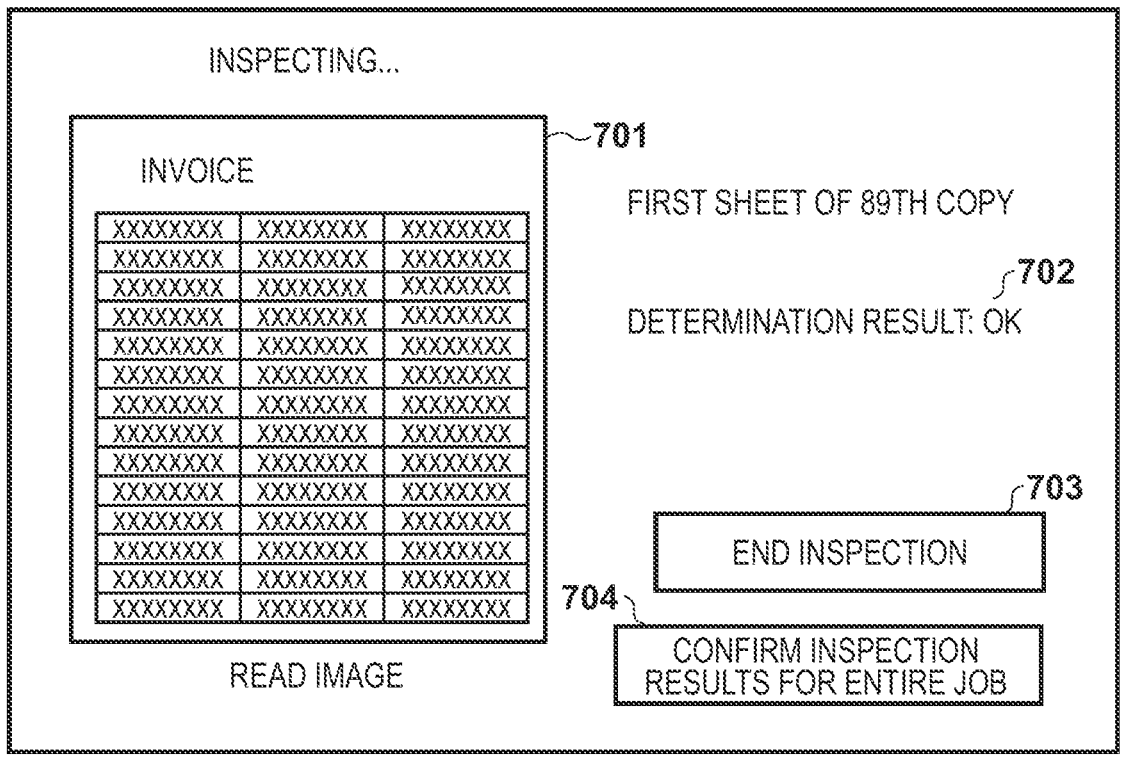
FIGS. 7A and 7B are diagrams illustrating examples of screens displayed on the display unit after starting inspection in the inspection apparatus according to the first embodiment.
Figure 7B:
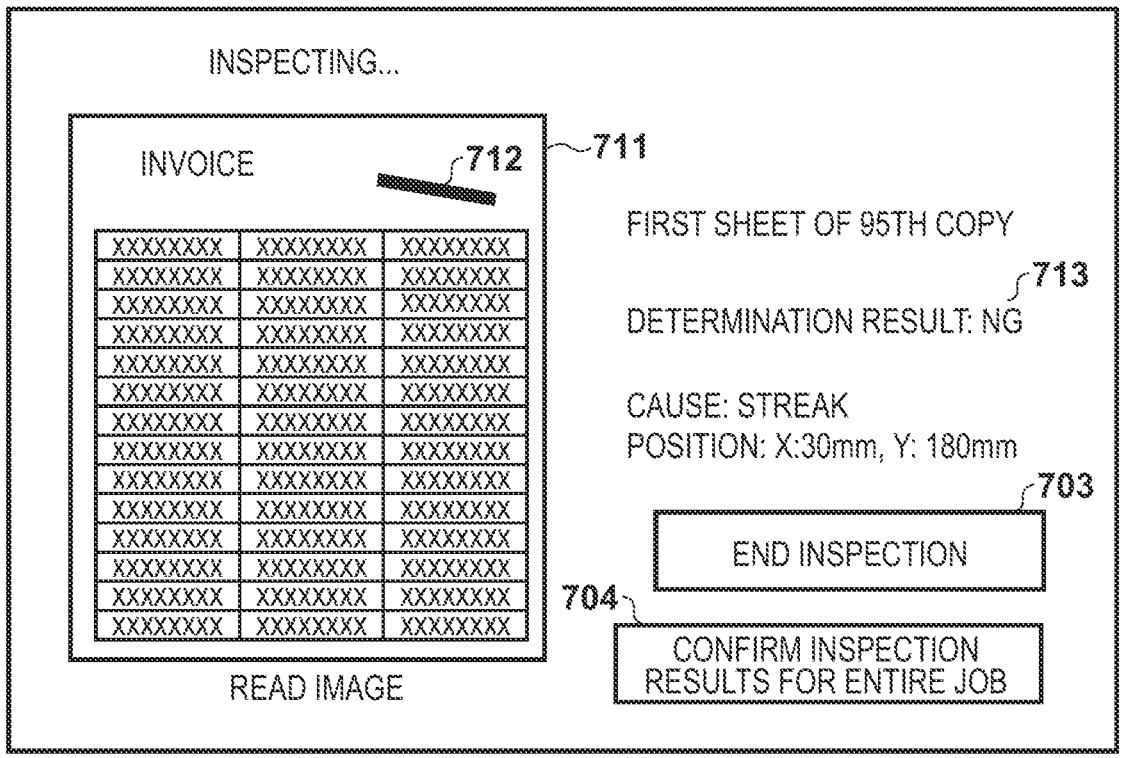

FIGS. 7A and 7B are diagrams illustrating examples of screens displayed on the display unit 241 of the inspection apparatus 109 according to the first embodiment after inspection is started. The display screen of FIG. 7A or 7B is displayed upon the inspection start button 406 of FIG. 4A being pressed.

FIG. 7A illustrates an example of a screen in a case where the last read image is determined to be a normal image. An image of the print sheet last read by the inspection apparatus 109 is displayed in a display area 701. A determination result 702 displays a result obtained by comparing the reference image registered in the inspection apparatus 109 with the read image data read by the inspection apparatus 109. In the example of FIG. 7A, since the image was determined to be a normal image, the determination result is displayed as "OK". An inspection end button 703 is a button for instructing inspection to be ended. When the inspection end button 703 is pressed, the inspection apparatus 109 ends the inspection processing and returns to the display screen of FIG. 4A. At this time, the inspection apparatus 109 transitions to the normal mode, and notifies the printing apparatus 107 that the inspection has been completed. The "confirm inspection results for entire job" button 704 is a button for instructing the display of the confirmation screen for the inspection results of the entire job. When the confirmation button 704 is pressed, the inspection results for each job as illustrated in FIG. 6, for example, are displayed.

FIG. 7B illustrates an example of a screen in a case where the last read image is determined to be a defective image. A read image is displayed in a display area 711, and this image is determined to be a defective image as a result of comparison between this image and a reference image. Therefore, "NG" is displayed as the determination result in a determination result 713. Further, the cause and the position at which NG was determined are displayed. In the example of FIG. 7B, it is indicated that it has been determined that the read image is a defective image since a streak 712 was detected in the read image.

FIG. 8A is a diagram illustrating an example of a screen that is displayed on the display unit 212 of the external controller 102 according to the first embodiment and that allows a user to select an inspection job to be executed.

A job list 801 illustrates a list of inspection jobs received from the PC 103. This job list 801 indicates a state in which four jobs have been received from the PC 103. A situation in which three jobs—"INVOICE", "QUOTATION", and "PAMPHLET"— have been selected as jobs to be executed is shown. By a next button 802 being pressed after jobs to be executed are selected in this way, the setting screen of the inspection job of FIG. 8B is transitioned to. A cancel button 803 is a button for instructing to cancel the settings on this screen and return to the original screen.

FIG. 8B is a diagram illustrating an example of an inspection job setting screen that is displayed on the display unit 212 of the external controller 102 according to the first embodiment. Although the above-mentioned FIG. 4A to FIG. 5B are examples of screens for when an inspection setting is performed on the inspection apparatus 109, an instruction to supply to the inspection apparatus 109 a print sheet to be inspected, such as a print sheet of a reference image or a sheet on which a barcode (identification information) is printed is issued from the external controller 102.

The job setting unit 811 of FIG. 8B is a setting unit for each job selected in the job list 801 of FIG. 8A. A number of copies 812 of the job sets the number of copies of each job. In the example of FIG. 8B, 300 copies have been set for the invoice, 100 copies have been set for the quotation, and 500 copies have been set for the pamphlet. One copy print start button 813 is a button for instructing only one copy of the inspection job corresponding to the button to be printed. The registration start button 413 of FIG. 4B is pressed to instruct the inspection apparatus 109 to start registration of a reference image. Thereafter, the one copy print button 813 is designated to instruct the external controller 102 to print one copy of a corresponding inspection job. When printing of one copy is instructed, printing of one copy is performed by the printing apparatus 107, and a later-described reference image switching sheet and a reference image are read by the inspection apparatus 109.

A discharge destination designation column 814 is a setting unit for setting the discharge destination of an inspection target sheet for when the inspection job is executed. Here, the large-volume stacker 110 is set as the discharge destination when inspection is OK, and the escape tray is set as the discharge destination to which the sheet is to be discharged when the image is determined to be a defective image in the inspection.

A "feed reference image from inserter" button 815 is a button for designating a sheet on which the reference image has been printed to be fed from the inserter. This button 815 is used to read a print sheet that has already been printed from the inserter 108 as a reference image. This is to be used when reading the reference image from a sheet determined by a user to be a normal image by visual observation rather than printing on a sheet and simultaneously performing registration of a reference image. When using this button 815, a user places a print sheet to be registered as a reference image in advance and a sheet on which a barcode is printed on the tray 321 of the inserter 108, and thereby the sheets are conveyed to the inspection apparatus 109. The sheet on which the reference image has been printed may be fed from the feeding unit 230 of the printing apparatus 107, but when the sheet is fed from the feeding unit 230, the image of the print sheet may end up being deformed since it will be pressurized and heated through the fixing unit 311 and the second fixing device unit 313. Therefore, when an image of a print sheet that is already printed is to be registered as a reference image, it is desirable that the print sheet be fed from the inserter 108 so as not to pass through the fixing unit.

The print start button 816 is a button for instructing printing of the inspection job to start. When the start of printing is instructed by the print start button 816, the external controller 102 inputs an inspection job to the printing apparatus 107 based on the settings of FIG. 8B. After the inspection apparatus 109 is instructed to start inspection by the inspection start button 406 in FIG. 4A, an instruction to the external controller 102 to start printing for the inspection job is made by the print start button 816. Upon an instruction to start printing for an inspection job, the external controller 102 inputs print data to the printing apparatus 107, and instructs the printing apparatus 107 to print on a sheet and to convey the printed sheet to the inspection apparatus 109. When the printed sheet has been conveyed thereto, the inspection apparatus 109 reads an image of the printed sheet and performs inspection processing of the printed sheet. A cancel button 817 is a button for instructing to cancel the settings on this screen and return to the original screen.

Figure 9:
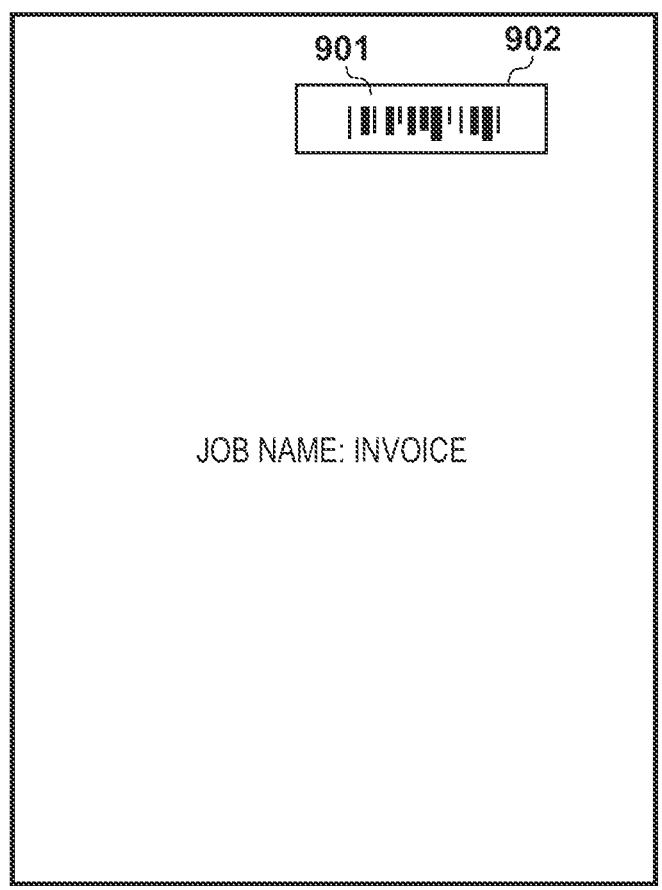
FIG. 9 is a diagram illustrating an example of a reference image switching sheet that a printing apparatus according to the first embodiment prints at the lead of a job.

FIG. 9 is a diagram illustrating an example of a reference image switching sheet that the printing apparatus 107 according to the first embodiment prints at the lead of a job.

The reference image switching sheet is printed at the lead of the job to be printed to register the reference image. Therefore, when the inspection apparatus 109 detects the reference image switching sheet, the images of the subsequent sheets are sequentially read and registered as reference images.

A barcode 901 is a barcode generated by the external controller 102 when the reference image is registered, and a unique barcode is generated for each job. A barcode inspection region 902 indicates an inspection region to be inspected for the presence or absence of a barcode at the time of inspection by the inspection apparatus 109. At the time of registration of the reference image, the inspection apparatus 109 trims the barcode inspection region 902 of the image of the read reference image switching sheet, and holds the image data obtained by reading that scanning region in the memory 239. At the time of executing the inspection, the inspection apparatus 109 compares the image data of the barcode inspection region 902 of the image to be inspected with the image of the barcode held in the memory 239, and determines whether or not the read sheet is a reference image switching sheet based on the comparison result. The barcode comparison is performed against all of the barcodes held in the memory 239.

Figure 10:
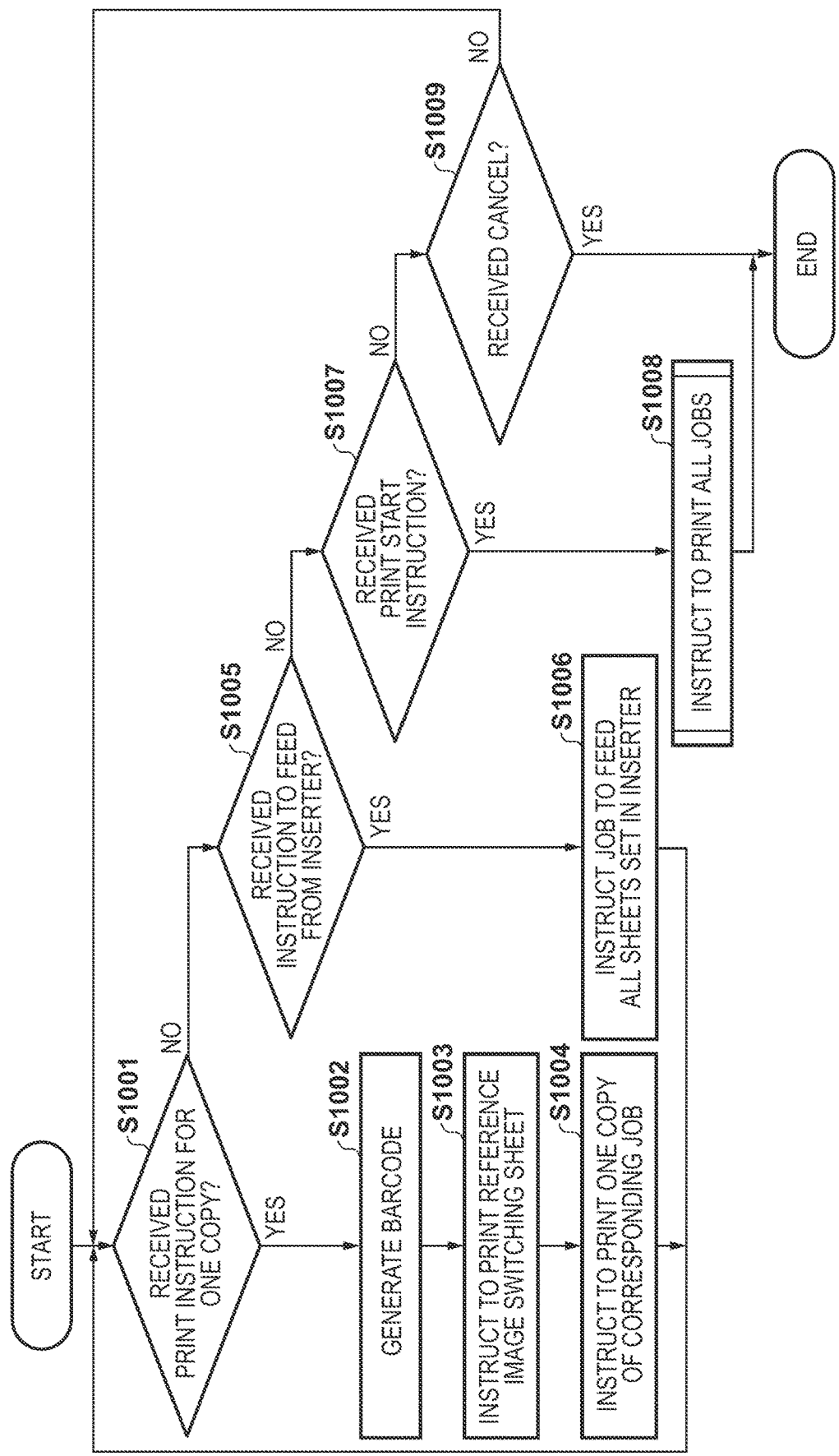
FIG. 10 is a flowchart for explaining a process executed by the external controller according to the first embodiment in accordance with an instruction from the user via the inspection job setting screen of FIG. 8B.

FIG. 10 is a flowchart for explaining a process executed by the external controller 102 according to the first embodiment in accordance with an instruction from the user via the inspection job setting screen of FIG. 8B. The process described in the flowchart is achieved by the CPU 208 executing a program deployed in the memory 209.

In step S1001, the CPU 208 determines whether or not a print instruction for one copy of a print job has been received. This corresponds to the case where the user has pressed the one copy print button 813 for one copy on the setting screen of the inspection job in FIG. 8B. The process proceeds to step S1002 if it is determined in step S1001 that an instruction to print one copy has been received, but proceeds to step S1005 otherwise. In step S1002, the CPU 208 generates a uniquely identifiable barcode and stores print image data and the barcode in association in the memory 209. The process proceeds to step S1003, the CPU 208 instructs the printing apparatus 107 to print the reference image switching sheet based on the image data generated in step S1002 and stored in the memory 209. Then, the process proceeds to step S1004, the CPU 208 instructs the printing apparatus 107 to print one copy of the selected print data, and the process proceeds to step S1001.

If it is determined in step S1001 that a print instruction for one copy has not been received, the process proceeds to step S1005, and the CPU 208 determines whether an instruction to feed sheets of reference images from the inserter 108 has been received. This corresponds to the case where the "feed reference image from inserter" button 815 is pressed on the screen of the FIG. 8B. If it is determined that the instruction by the button 815 has been received, the process proceeds to step S1006. On the other hand, if the CPU 208 determines in step S1005 that an instruction by the button 815 has not been received, the process proceeds to step S1007. In step S1006, the CPU 208 instructs the printing apparatus 107 to feed the sheets set in the inserter 108, and the process proceeds to step S1001. At this time, the number of sheets of one copy including the reference image switching sheet is set in the inserter 108.

In step S1007, the CPU 208 determines whether or not a print start instruction has been received. This corresponds to the case where the print start button 816 is pressed on the screen of FIG. 8B. When the CPU 208, in step S1007, determines that the print start instruction is received, the process proceeds to step S1008, and when the CPU 208 determines that the print start instruction has not been received, the process proceeds to step S1009. In step S1008, the CPU 208 sequentially enters the jobs displayed in the job setting unit 811 of FIG. 8B into the printing apparatus 107 based on settings. This process will be described later with reference to the flowchart of FIG. 11.

In step S1009, the CPU 208 determines whether or not the cancel button 817 has been pressed on the screen of FIG. 8B. If it is determined that the cancel button 817 has been pressed, the process is ended. On the other hand, when the CPU 208 determines that the cancel instruction has not been received, the process proceeds to step S1001 and the above described processes are repeated.

Figure 11:
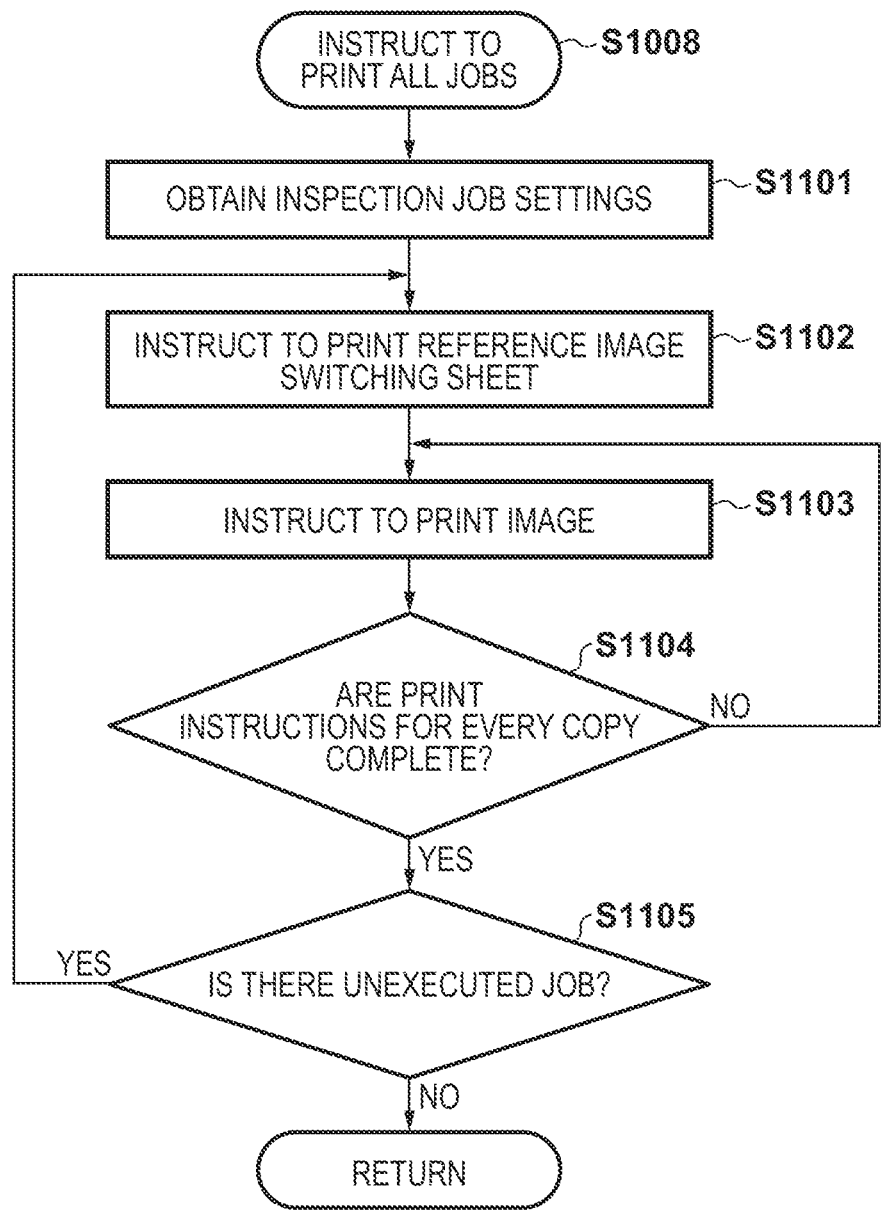
FIG. 11 is a flowchart for explaining a process for making an instruction to print all jobs in step S1008 of FIG. 10.

FIG. 11 is a flowchart for explaining a process for making an instruction to print all jobs in step S1008 of FIG. 10.

First, in step S1101, the CPU 208 obtains the number of copies of the job displayed in the job setting unit 811 of the inspection job setting screen in FIG. 8B, and the information in the discharge destination designation column 814. If a plurality of jobs are listed in the job setting unit 811, settings of the number of copies set for each job are sequentially obtained. Next, the process proceeds to step S1102, and the CPU 208 instructs the printing apparatus 107 to print the reference image switching sheet. Next, the process proceeds to step S1103, and the CPU 208 issues a print instruction to instruct the printing apparatus 107 to print image data of the inspection target. Then, the process proceeds to step S1104, the CPU 208 determines whether or not print processing for print instructions of the number of copies specified in the job setting unit 811 has been completed, and if it is determined that the print processing for the print instructions for the specified number of copies has been completed, the process proceeds to step S1105, and if not, the process returns to step S1103. In step S1105, the CPU 208 determines whether the print processing for all jobs in job setting unit 811 has been completed. When the CPU 208, in step S1105, determines that the print processing has not been completed for all jobs, the process proceeds to step S1102 and the CPU 208 issues a print instruction for a reference image switching sheet associated with the next inspection job to be executed. When the CPU 208, in step S1105, determines that the print processing has been completed for all jobs, the CPU 208 ends this process.

As described above, according to this processing, the printing apparatus 107 can execute print processing based on jobs for registering reference images according to content set on an inspection job setting screen. At this time, since the reference image switching sheet is inserted at the lead of the print sheet group printed and discharged in each job, the inspection apparatus 109 can ascertain the reference images corresponding to each job.

Figure 12:
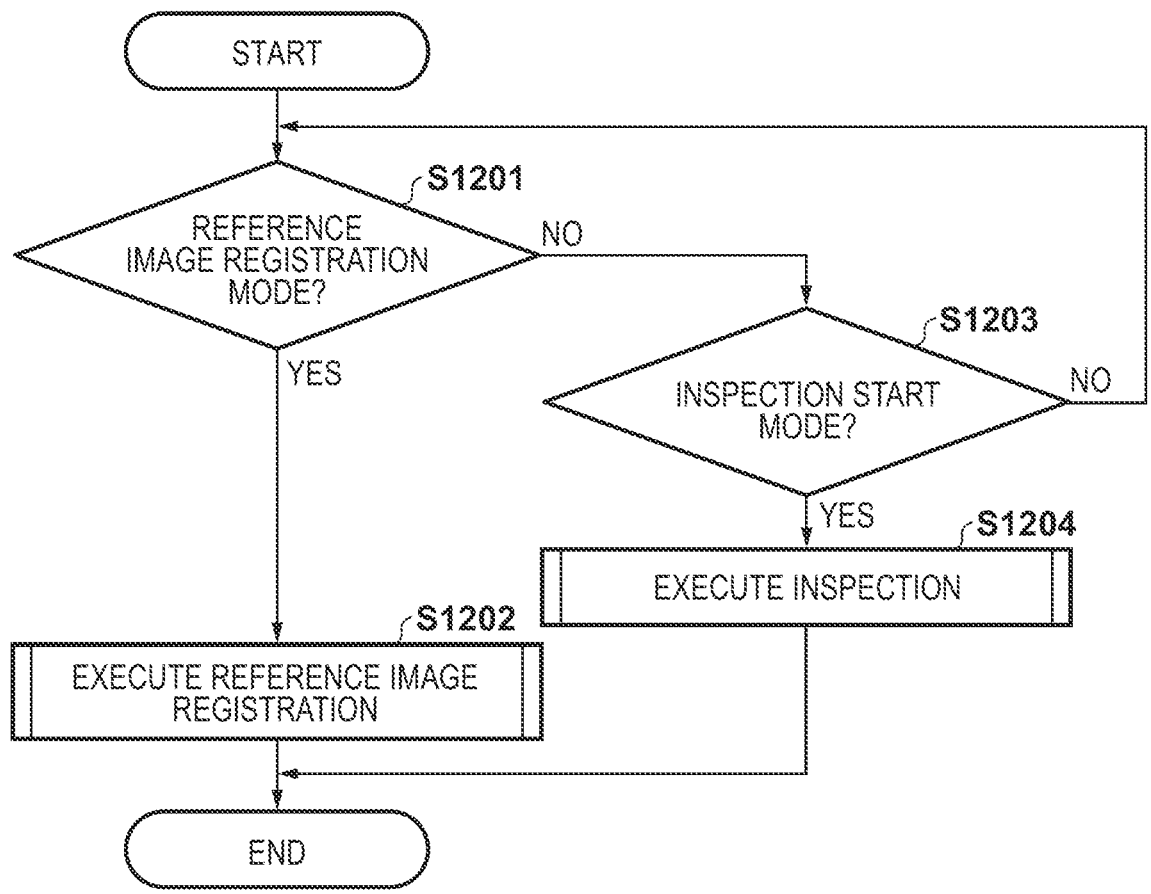
FIG. 12 is a flowchart for explaining an outline of processing performed by the inspection apparatus according to the first embodiment.

FIG. 12 is a flowchart for explaining an outline of processing performed by the inspection apparatus 109 according to the first embodiment. Note that the processes described in this flowchart are achieved by the CPU 238 of the inspection apparatus 109 executing a program deployed in the memory 239.

First, in step S1201, the CPU 238 determines whether or not registration of the reference image has been instructed by the registration start button 413 of the reference image of FIG. 4B and the reference image registration mode has been transitioned into. If it is determined that the reference image registration mode has been transitioned into, the process proceeds to step S1202 and the reference image registration process (FIG. 13) is executed. When the registration process is completed, the process ends.

On the other hand, if it is determined in step S1201 that the reference image registration mode has not been transitioned into, the process proceeds to step S1203. In step S1203, the CPU 238 determines whether or not an instruction to start the inspection has been made by the inspection start button 406 of FIG. 4A and the inspection mode has been transitioned into. If it is determined in step S1203 to be the inspection mode, the process proceeds to step S1204, but if it is determined not to be the inspection mode, the process returns to step S1201 and the processes are repeated. In step S1204, the CPU 238 executed the inspection process (FIG. 14) and terminates this process.

Figure 13:
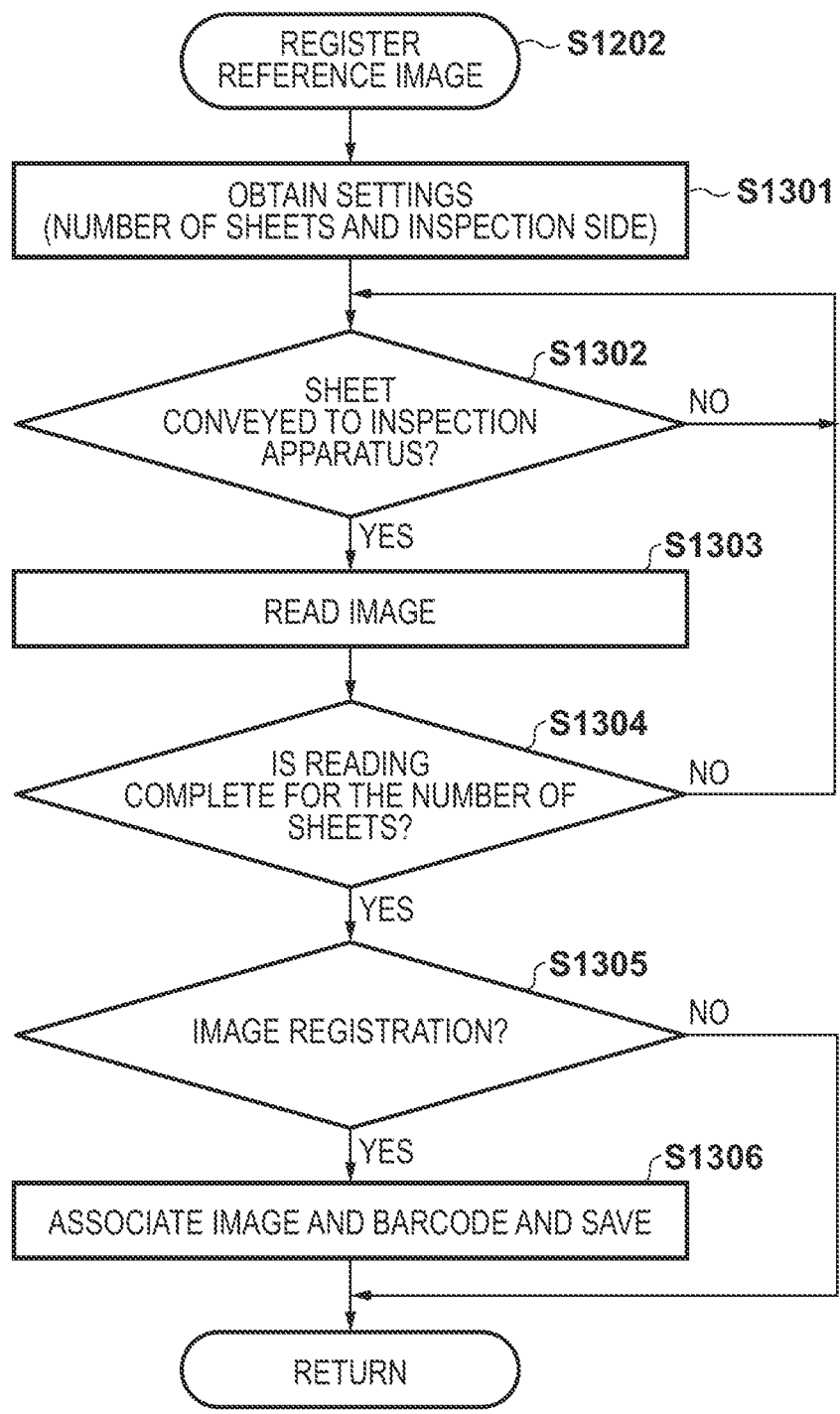
FIG. 13 is a flowchart for explaining a reference image registration process in step S1202 of FIG. 12.

FIG. 13 is a flowchart for explaining the reference image registration process in step S1202 of FIG. 12. Here, an example is illustrated in which print sheets of one copy are read and reference images are registered.

First, in step S1301, the CPU 238 obtains reference image registration settings. Setting values of the registration settings include the number of sheets per copy set in FIG. 4B, the side on which the inspection is performed, and the like. Next, the process proceeds to step S1302, where the CPU 238 waits for a sheet to be conveyed to the inspection apparatus 109. When the CPU 238, in step S1302, determines that the sheet has been conveyed, the process proceeds to step S1303, but when the CPU 238 determines that the sheet has not been conveyed, the process returns to step S1302 and the CPU 238 waits for a sheet to be conveyed. In step S1303, the CPU 238 reads an image of the sheet using the camera 331 and the camera 332 to obtain image data, and stores the image data in the memory 239 of the inspection apparatus 109. The stored image data is displayed in the display area 501 of FIG. 5A. Then, the process proceeds to step S1304 and the CPU 238 determines whether or not images have been read for the number of sheets set in the setting value obtained in step S1301. In step S1304, the process proceeds to step S1305 if it determines that images for set number of sheets have been read, and otherwise, the process returns to step S1302 and the CPU 238 repeats the above-described processes. In step S1305, the CPU 238 determines whether or not an instruction has been given to save the image data obtained by reading the sheets as reference images. This corresponds to an instruction by the registration button 505 of FIG. 5A. When the CPU 238, in step S1305, determines that registration of the reference images is instructed by the registration button 505 being pressed, the process proceeds to step S1306. In step S1306, the CPU 238 trims the barcode of the barcode inspection region 902 of the reference image switching sheet held in the memory 239 and stores the image data in the memory 239 as a reference image group in association with the barcode, and then ends this process. On the other hand, when reference image registration has not been instructed, this processing is terminated as it is. This corresponds to the case where the cancel button 506 of FIG. 5A is pressed.

Thus, in the registration mode of the reference image, a series of reference images managed by the barcode of the lead reference image switching sheet can be registered.

Figure 14:
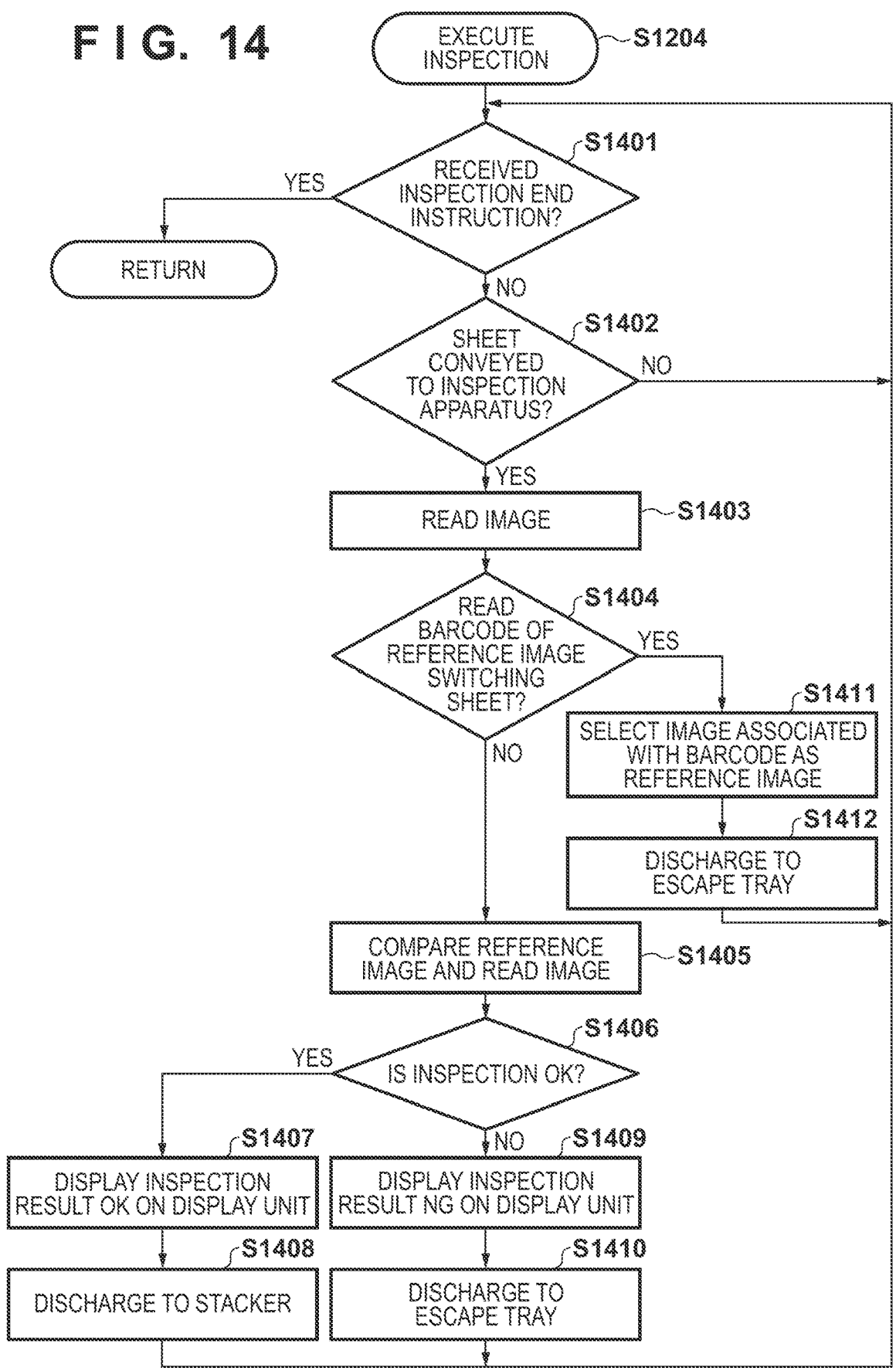
FIG. 14 is a flowchart for explaining details of an inspection process of step S1204 of FIG. 12.

FIG. 14 is a flowchart for explaining details of an inspection process in step S1204 of FIG. 12.

First, in step S1401, the CPU 238 determines whether or not the end of inspection is instructed by the inspection end button 703 illustrated in FIG. 7A. If it is determined in step S1401 that the end of inspection has been instructed, this process is ended. If it is determined in step S1401 that the end of the inspection has not been instructed, the process proceeds to step S1402. Next, in step S1402, the CPU 238 determines whether or not a sheet has been conveyed to the inspection apparatus 109. If it is determined that the sheet has not been conveyed, the process returns to step S1401 and the above-described process is repeated. If it is determined that the sheet has been conveyed in step S1402, the process proceeds to step S1403, and in step S1403, the CPU 238 reads an image of the conveyed sheet using the camera 331 and the camera 332 to obtain image data. The image data is stored in the memory 239 of the inspection apparatus 109. The stored image data is displayed in the read display area 701 of FIG. 7A.

Next, the process proceeds to step S1404 and the CPU 238 determines whether the image data obtained in step S1403 is an image of a reference image switching sheet. Specifically, the CPU 238 makes a determination by comparing the image data of a portion corresponding to the barcode inspection region 902 of the image data obtained by the reading with the barcode images held in the memory 239. At this time, the CPU 238 compares against all of the barcodes held in the memory 239. If the CPU 238, in step S1404, determines that the barcode of a reference image switching sheet was read, the process proceeds to step S1411. Meanwhile, if the CPU 238, in step S1404, determines that it is not a reference image switching sheet, the process proceeds to step S1405. In step S1411, the CPU 238 selects image data associated with the barcode in the memory 239 as the reference images. As a result, in the subsequent inspection processing, the reference image group selected here is compared with the printed sheet group, to execute the inspection processing. The process proceeds to step S1412, the CPU 238 instructs the printing apparatus 107 to discharge the reference image switching sheet to the escape tray 346 of the large-volume stacker 110. Thereafter, the process returns to step S1401 and the above described processes are repeated.

Thus, since the reference image switching sheet is discharged to the escape tray 346, the reference image switching sheet does not affect the order of the paper to be inspected or the corresponding reference image order, and the subsequent inspection processing can be normally performed.

In step S1405, the CPU 238 compares the image data of the sheet to be inspected obtained in step S1403 with the corresponding reference image. The reference image is based on a setting registered in the inspection apparatus 109 by the registration button 403 of the reference image in FIG. 4A. Then, the process proceeds to step S1406, the CPU 238 determines whether or not the image data is a defective image as a result of the comparison against the reference image of step S1405. If the CPU 238 determines, in step S1406, that the image data is a normal image (inspection OK), the process proceeds to step S1407, and if the CPU 238 determines that the image data is a defective image (inspection NG), the process proceeds to step S1409. In step S1407, the CPU 238 displays on the display unit 241 of the inspection apparatus 109 that the inspection result is OK. FIG. 7A illustrates an example of the screen displayed in step S1407. Then the process proceeds to step S1408, the CPU 238 instructs the printing apparatus 107 to discharge the sheet from which the image has been read to the stacker 110. The discharge destination to which the sheet is discharged here is based on the discharge destination designated in setting screen discharge destination 814 of FIG. 8B. Accordingly, the printing apparatus 107 instructs the large-volume stacker 110 to discharge the printed paper determined to be normal, based on instruction from the inspection apparatus 109. Thereafter, the process advances to step S1401 and the above-described processes are repeated.

In step S1409, the CPU 238 displays on the display unit 241 of the inspection apparatus 109 that the inspection result is NG. FIG. 7B illustrates an example of the screen displayed in step S1409. Next, the process proceeds to step S1410, the CPU 238 instructs the printing apparatus 107 to discharge the printed paper to the escape tray 346 of the large-volume stacker 110. The discharge destination to which the sheet to be determined NG is discharged here is based on the discharge destination for when inspection is NG, which is designated in setting screen discharge destination 814 of FIG. 8B. Accordingly, the printing apparatus 107 instructs the large-volume stacker 110 to discharge the sheet to the escape tray 346 based on an instruction from the inspection apparatus 109. Thereafter, the process returns to step S1401 and the above-described processes are repeated.

Figure 15A:
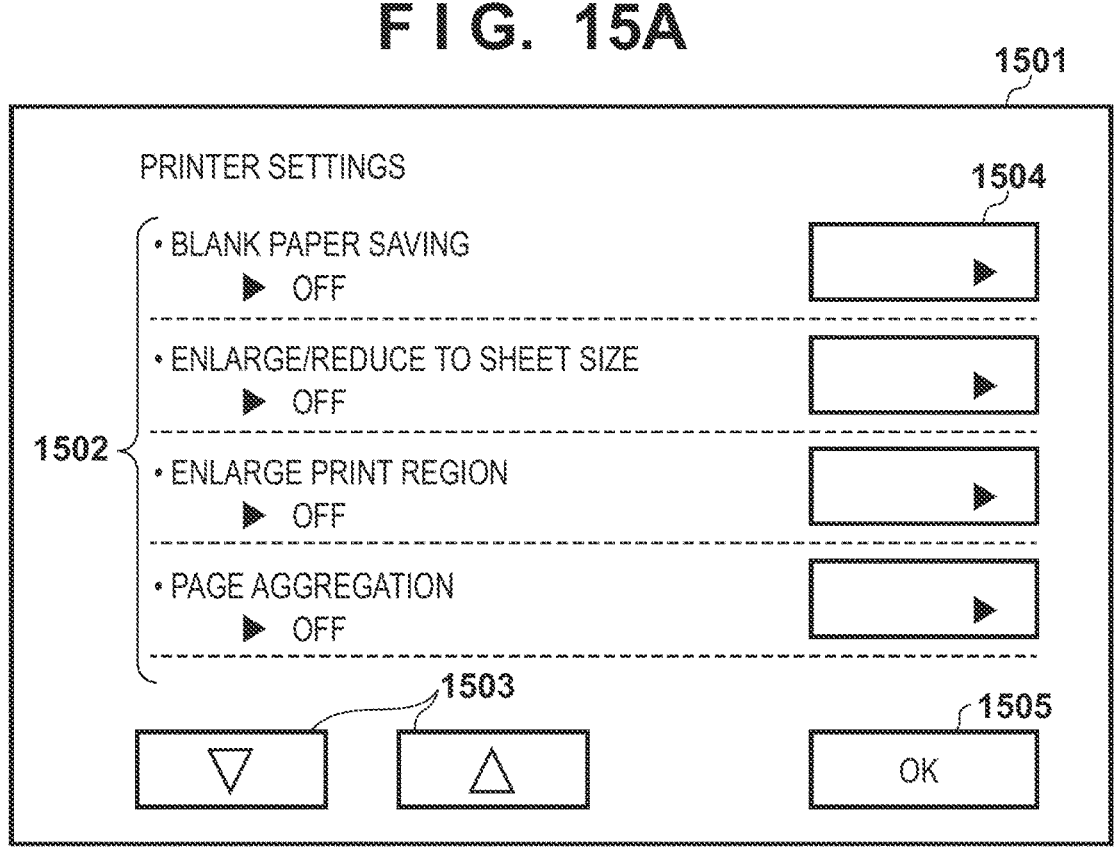
FIG. 15A is a diagram illustrating an example of a printer setting screen that is for making print settings for the printing apparatus and that is displayed on a display unit of the printing apparatus according to the first embodiment.

FIG. 15A is a diagram illustrating an example of a printer setting screen 1501 that is for making print settings for the printing apparatus and that is displayed on the display unit 225 of the printing apparatus 107 according to the first embodiment.

Figure 15B:
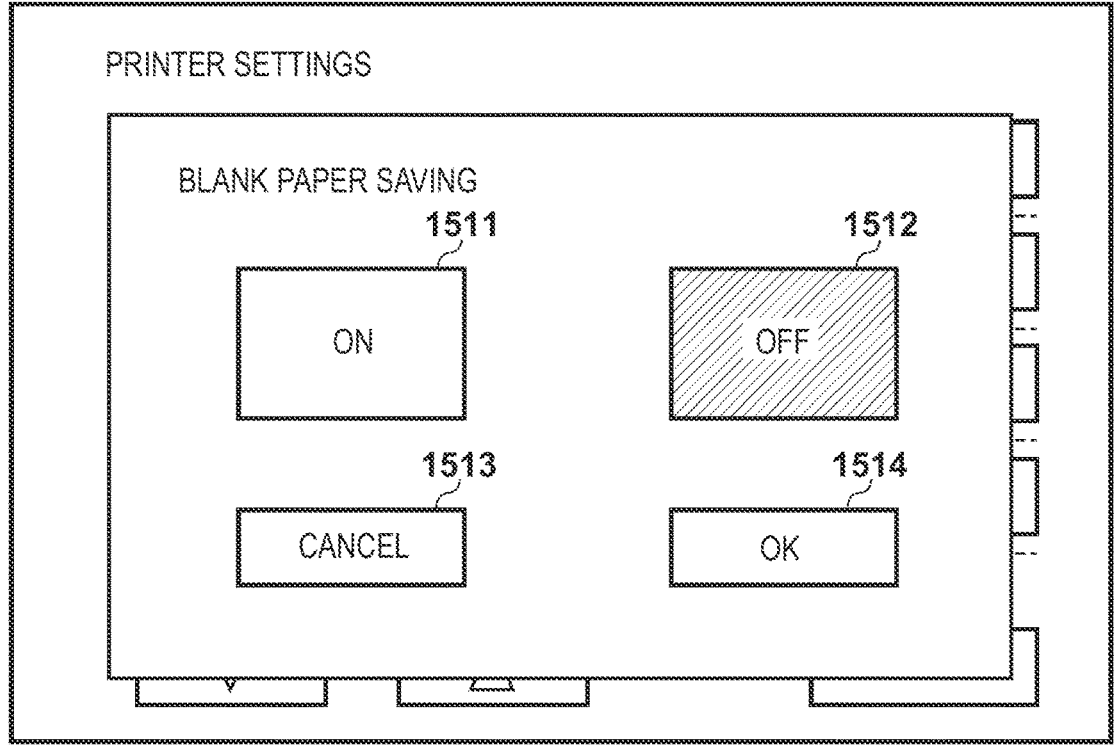
FIG. 15B depicts a view illustrating an example of a screen for a blank paper saving setting displayed when a button 1504 of the FIG. 15A is pressed.

The printer setting screen 1501 is displayed based on an instruction of the CPU 222 of the printing apparatus 107. Printer setting items are displayed as a list 1502 and displayed items can be scrolled by scroll buttons 1503. The printer setting items are displayed by pressing the button on the right side of each item. A button 1504 is a button for displaying a blank paper saving setting screen (FIG. 15B). The printer setting screen 1501 is closed by pressing the OK button 1505.

FIG. 15B depicts a view that illustrates an example of the blank paper saving setting screen for a blank paper saving setting displayed when the button 1504 of the FIG. 15A is pressed.

The blank paper saving setting screen is displayed on the display unit 225 based on an instruction of the CPU 222 of the printing apparatus 107. The blank paper saving function is a function for preventing output (printing) of a page when the image data to be output is blank data (data for which there is no object to be printed). The blank paper saving setting screen includes an "ON" button 1511 for blank paper saving, an "OFF" button 1512 for not blank paper saving, a cancel button 1513, and an OK button 1514. In this blank paper saving setting screen, the currently set item is colored, and each time the selection is switched, the color changes. In FIG. 15B, it can be seen that the "OFF" button 1512 for not performing blank paper saving is colored, and the mode for not performing blank paper saving is selected. When the cancel button 1513 is pressed, the setting on this screen is canceled and the screen is closed. When the OK button 1514 is pressed, the contents set on this screen are saved, and this screen is closed.

Figure 16:
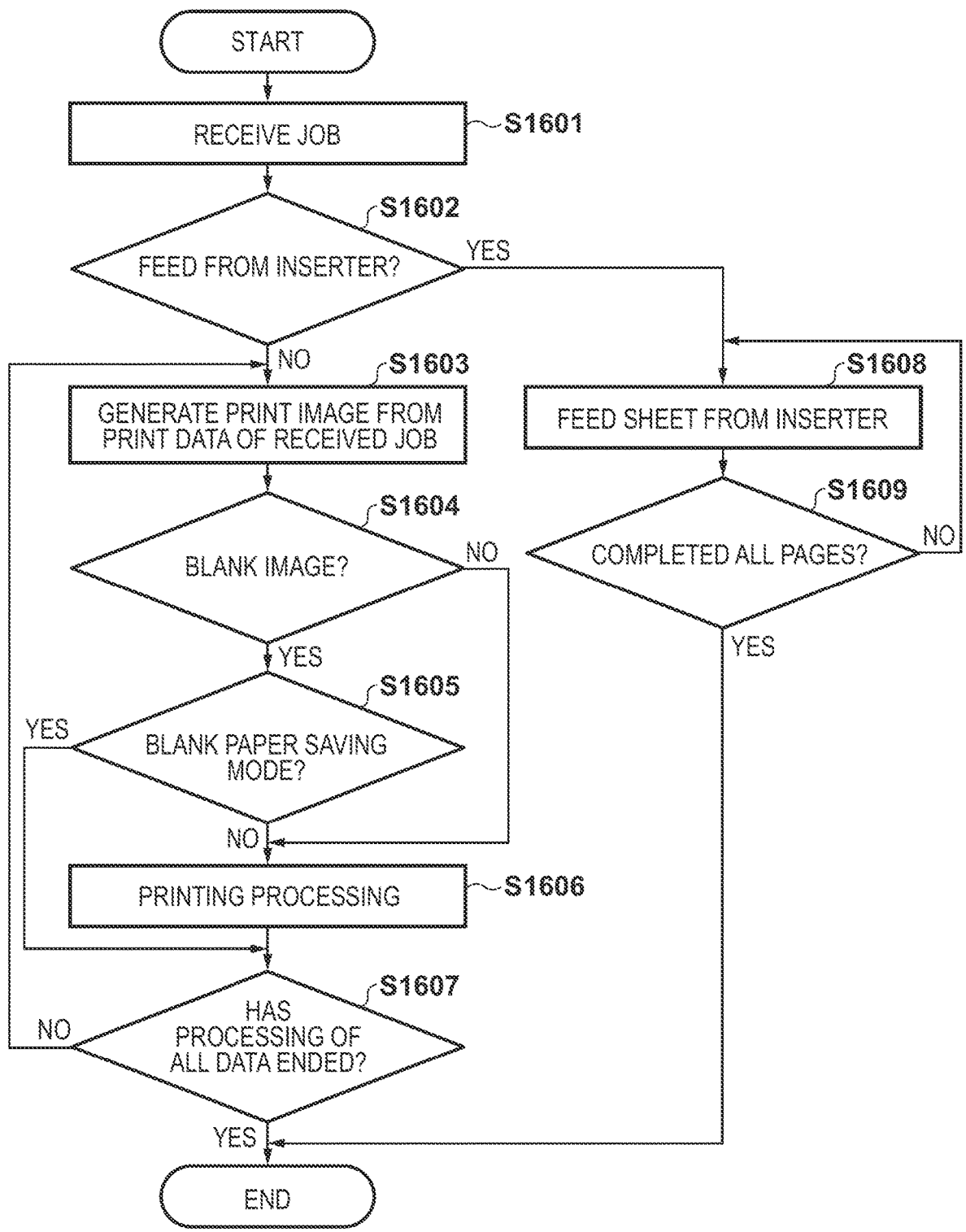
FIG. 16 is a flowchart for explaining processing for when the printing apparatus performs print processing according to the first embodiment.

FIG. 16 is a flowchart for explaining processing when the printing apparatus 107 performs print processing according to the first embodiment. Note that the processes described in this flowchart are achieved by the CPU 222 of the printing apparatus 107 executing a program deployed in the memory 223.

First, in step S1601, the CPU 222 receives a job from the external controller 102. Then, the process proceeds to step S1602 and the CPU 222 determines whether the received job is a job for feeding a sheet from the inserter 108. If it is determined here that the job is for feeding sheets from the inserter 108, the process proceeds to step S1608, and if it is determined that the received job is not a job for feeding from the inserter 108, the process proceeds to step S1603. In step S1608, the CPU 222 feeds a sheet from the inserter 108. Then, the process proceeds to step S1609 and the CPU 222 executes step S1608 until all the sheets specified in the job received in step S1601 have been fed. The process of step S1608 is repeated until it is determined that the feeding of all of the sheets has been completed, and if it is determined that the feeding of all the sheets has been completed, this processing is ended.

In step S1603, the CPU 222 generates print image data from the print data of the job received in step S1601. Then, the process proceeds to step S1604, and the CPU 222 determines whether the image data generated in step S1603 is blank image data. If it is determined in step S1604 that the print image data is blank, the process proceeds to step S1605, but if not, step S1605 is skipped and the process proceeds to step S1606. In step S1605, the CPU 222 determines whether the print setting is blank paper saving mode. If it is determined that the mode is the blank paper saving mode, the print processing of step S1606 is skipped and the process proceeds to step S1607. Meanwhile, if it is determined in step S1605 that it is not the blank paper saving mode, the process proceeds to step S1606. In step S1606, the CPU 222 performs print processing that prints the print image data and the process proceeds to step S1607. In step S1607, the CPU 222 determines whether or not the processing for all print image data has ended. If it is determined that the processing of all print image data has not ended, the process returns to step S1603 and the above-described processes are repeated. If it is determined that the processing of all the print image data has been ended, this processing is ended.

According to this processing, when the blank paper saving mode is set, it is possible to prevent printing of a blank image.

Figure 17:
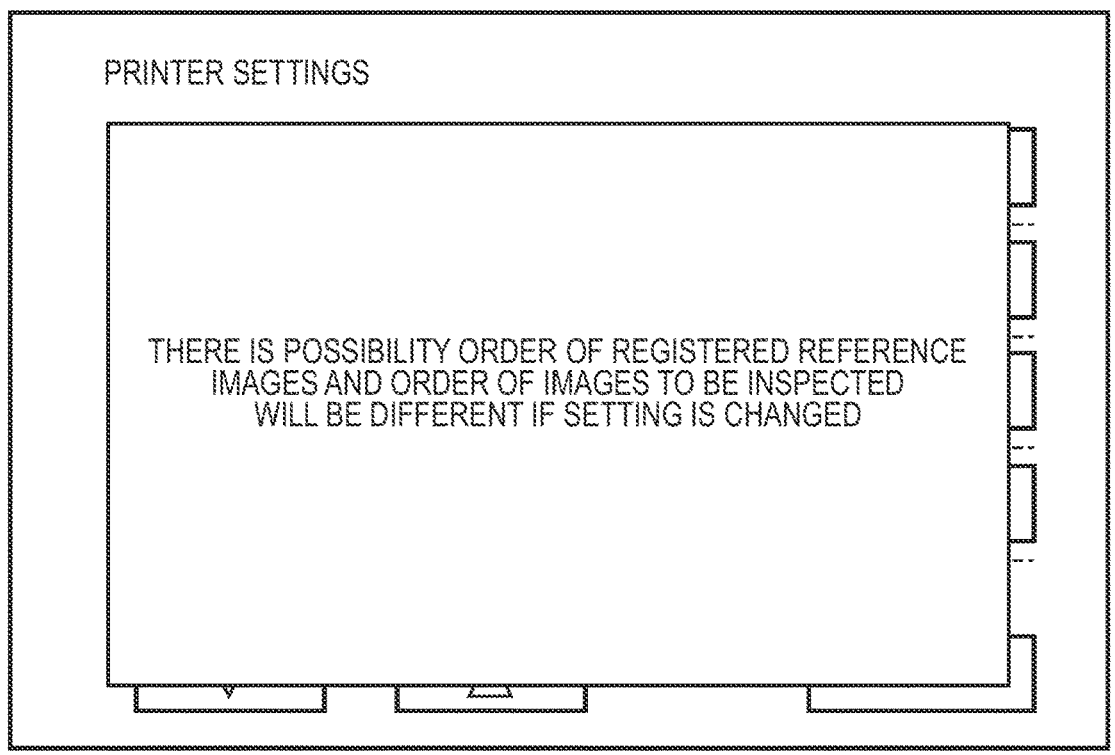
FIG. 17 is a diagram illustrating an exemplary screen displayed on the display unit when the button 1504 is pressed on the printer setting screen in FIG. 15A when the printing apparatus according to the first embodiment is in an inspection mode.

FIG. 17 is a diagram illustrating an exemplary screen displayed on the display unit 225 when the button 1504 is pressed on the printer setting screen 1501 in FIG. 15A when the printing apparatus 107 according to the first embodiment is in the inspection mode.

This screen is displayed based on an instruction of the CPU 222 of the printing apparatus 107. A message warning that the order of the registered reference images may differ from the order of the images to be inspected if the blank paper saving mode setting is changed is displayed on this screen.

Figure 18:
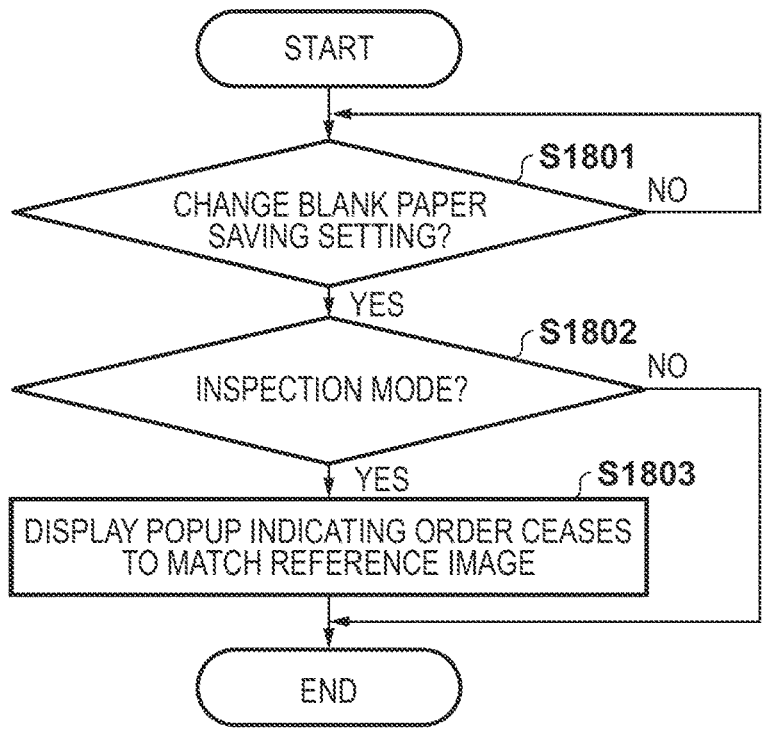
FIG. 18 is a flowchart for explaining a process executed by the printing apparatus according to the first embodiment when a button is pressed on the printer setting screen of FIG. 15A.

FIG. 18 is a flowchart for explaining a process executed by the printing apparatus 107 according to the first embodiment when the button 1504 is pressed on the printer setting screen 1501 of FIG. 15A. The processes described in this flowchart are achieved by the CPU 222 executing a program deployed in the memory 223.

First, in step S1801, the CPU 222 determines whether or not the button 1504 that instructs the display of the blank paper saving setting screen has been pressed. Here, if it is determined that the button 1504 has been pressed, the process proceeds to step S1802, but if not, the process proceeds to step S1801. Next, in step S1802, the CPU 222 determines whether or not the inspection apparatus 109 is in the inspection mode. If it is determined that the inspection apparatus 109 is in the inspection mode, the process proceeds to step S1803, and if not, the processing is ended. In step S1803, the CPU 222 displays the message warning that the order of registered reference images may differ from the order of printed results, and ends this process. That is, if the blank paper saving was not set at the time of reference image registration, and blank paper saving is set in the inspection mode, there is the possibility that an image to be inspected will be compared with blank sheet data, and the comparison will not be made against the correct reference image; therefore the message is displayed.

As described above, according to the first embodiment, when the blank paper saving mode is instructed in the inspection mode, there is a possibility that the order of the registered reference images and the order of the images to be inspected will differ from each other, so it is possible to warn the user thereof.

Second Embodiment

Next, a second embodiment of the present invention will be described. Note that, since the system configuration and the hardware configuration of each apparatus according to the second embodiment are the same as the first embodiment described above, description thereof will be omitted. In the second embodiment, when the inspection apparatus 109 is in the inspection mode, the blank paper saving mode cannot be set by the printing apparatus 107.

Figure 19:
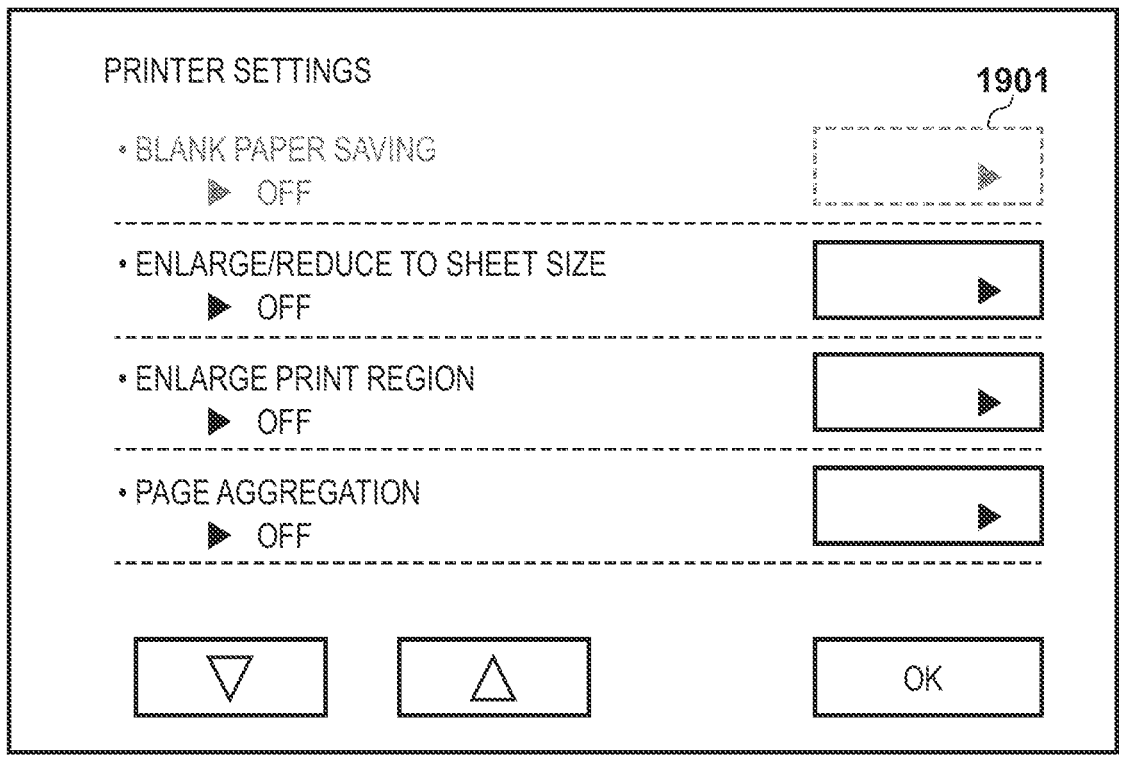
FIG. 19 is a diagram illustrating an example of a printer setting screen that is for making a print setting of the printing apparatus and that is displayed on the display unit of the printing apparatus according to a second embodiment.

FIG. 19 is a diagram illustrating an example of a printer setting screen that is for performing a print setting of the printing apparatus and that is displayed on the display unit 225 of the printing apparatus 107 according to the second embodiment.

Here, when the inspection apparatus 109 is in the inspection mode, a blank paper saving item and a blank paper saving setting screen display button 1901 of the printer setting screen are grayed out and cannot be selected.

Figure 20:
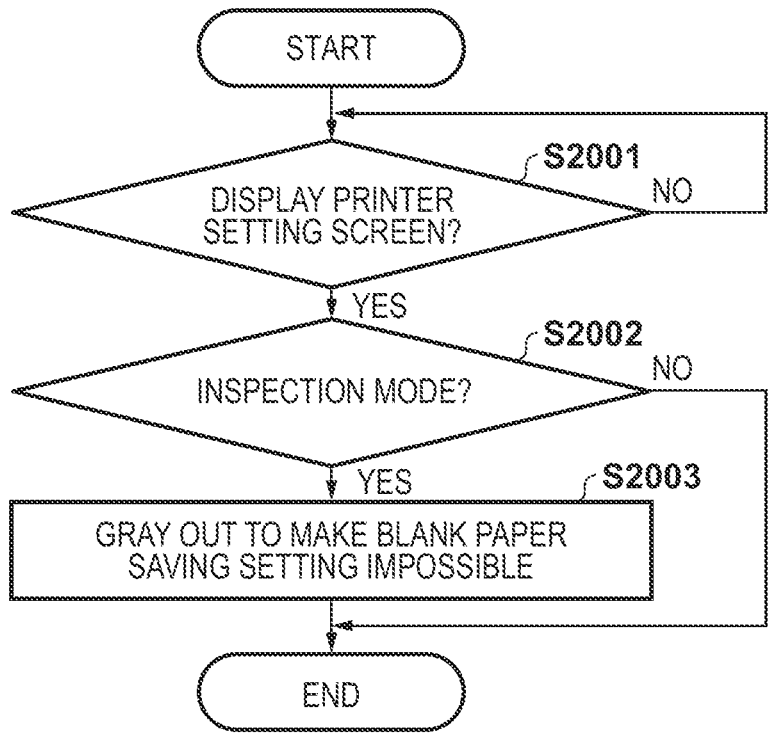
FIG. 20 is a flowchart for explaining processing of the printing apparatus according to the second embodiment.

FIG. 20 is a flowchart for explaining processing of the printing apparatus 107 according to the second embodiment. Note that the processes described in this flowchart are achieved by the CPU 222 of the printing apparatus 107 executing a program deployed in the memory 223.

First, the CPU 222, in step S2001, determines whether an instruction to display the printer setting screen was made. If it is determined that the instruction to display the printer setting screen was made, the process proceeds to step S2002, but if not, the process returns to step S2001. Next, in step S2002, the CPU 222 determines whether or not the inspection apparatus 109 is in the inspection mode. If it is determined that the inspection apparatus 109 is in the inspection mode, the process proceeds to step S2003, and if it is determined that the inspection apparatus 109 is not in the inspection mode, the process is ended. In step S2003, the CPU 222 grays out the blank paper saving item and the button 1901 as illustrated in FIG. 19, for example, so that the blank paper saving setting cannot be changed, and ends this processing.

As described above, according to the second embodiment, when the blank paper saving mode is made to be unsettable in the inspection mode, there is the effect of preventing the order of the registered reference images and the order of the images to be inspected from differing from each other.

Other Examples

In the first and second embodiments described above, the setting of the inspection apparatus is performed using the display unit 241 of the inspection apparatus 109, and the print instruction of the inspection job is performed using the display unit 212 of the external controller 102. However, the present invention is not limited to this configuration. The inspection setting and the print instruction may be performed by any one of the external controller 102, the printing apparatus 107, the inspection apparatus 109, and the client PC 103. For example, configuration may be such that both the inspection setting and the print instruction can be performed using the display unit 225 of the printing apparatus 107.

In the first and second embodiments, the reference image is held in the memory 209 of the external controller 102 and the memory 239 of the inspection apparatus 109, but for example, configuration may be such that the reference image may be held in a server accessible by the external controller 102 and the inspection apparatus 109.

Further, in the above-described embodiment, inconsistency due to a change in the setting of the blank paper saving function has been described, but the present invention can be applied to the case of changing the setting for a divider sheet insertion function for managing each job or each bundle.

In addition, in the above-described embodiment, if a job for inserting a divider sheet for each specific number of copies is executed in order to perform management for each bundle, the printing apparatus 107 controls the printing of a barcode associated with a reference image for a divider sheet inserted at the lead of each job. By performing such control, some of the divider sheets between the bundles can be used as a reference image switching sheet.

In the above embodiment, a reference image switching sheet for registering the reference image and sheets of images to be inspected are separately conveyed to the inspection apparatus and read. However, the present invention is not limited to this configuration. A barcode associated with a reference image conveyed to the inspection apparatus at the time of registration of the reference image and an image to be inspected may be printed on the same sheet. More specifically, an image to be inspected may be printed on a paper of a size larger than the paper size of the image to be inspected, and a barcode linked to the reference image may be printed in a margin. The inspection apparatus 109 may be configured to register the reference image after trimming each of the reference image region and the barcode region.

In the above-described embodiment, when the printing apparatus is instructed to set the blank paper saving mode when in the inspection mode, a warning is given or the blank paper saving mode is made to be unsettable; however, this control may be performed by the external controller 102, for example. In short, any apparatus of the system according to the embodiment may execute this control.

Other Embodiments

Embodiments of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-026644, filed Feb. 22, 2021, which is hereby incorporated by reference herein in its entirety.

What is claimed is:

1. A print system comprising a printing apparatus; an information processing apparatus operable to input a job to the printing apparatus and thereby cause the printing apparatus to print; and an inspection apparatus operable to receive sheets printed and discharged by the printing apparatus and inspect the sheets,
the inspection apparatus comprising:
one or more first processors that execute instructions stored in one or more first memories and being configured to:
register, as reference images, image data obtained by reading images of sheets printed by the printing apparatus in which a blank page setting function for skipping printing of a blank page is not designated;
in a case where an inspection mode for inspecting a sheet is enabled, compare the respective received sheets and a corresponding reference image among the registered reference images and thereby inspect images of the respective sheets to discharge the inspected sheet to a first tray or a second tray in accordance with an inspection result; and
the printing apparatus comprising:
one or more second processors that execute instruction stored in one or more second memories and being configured to:
skip printing of a blank page in a case that the blank page saving function is designated; and
in a case where the inspection mode is enabled, control to display a setting screen in which the blank page saving function is not able to be designated so that a setting of the blank page saving function in registering the reference images does not differ from a setting of the blank page saving function in the inspecting.

2. The print system according to claim 1, wherein the one or more second processors are further configured to:
control to display the setting screen so that the setting of the blank page saving function in the inspecting cannot be performed.

3. The print system according to claim 1, wherein the one or more first processors are further configured to:
set a reference image registration mode for registering the reference images to the inspection apparatus and set the inspection mode.

4. The print system according to claim 1, wherein,
in a reference image registration mode for registering the reference images, the information processing apparatus inputs to the printing apparatus a job for causing the printing apparatus to print the reference images.

5. The print system according to claim 1, wherein,
in a reference image registration mode for registering the reference images, the information processing apparatus feeds to the inspection apparatus sheets on which the reference images have been respectively printed in advance, and
the inspection apparatus respectively registers, as the reference images, image data obtained by reading the reference images of the fed sheets.

6. The print system according to claim 4, wherein a leading sheet printed in the job for causing the reference images to be printed includes identification information indicating switching of a reference image.

7. The print system according to claim 6, wherein, in the reference image registration mode, the inspection apparatus respectively registers the reference images in association with the identification information.

8. The print system according to claim 1, wherein, in a reference image registration mode for registering the reference images, the inspection apparatus reads images of a group of sheets printed in units of copies.

9. The print system according to claim 1, wherein, in the inspection mode, the inspection apparatus reads images of a group of sheets printed in units of copies, respectively compares the images with a group of reference images registered in units of copies, and thereby performs inspection of the printed sheets.

10. The print system according to claim 6, wherein, in the inspection mode, when the inspection apparatus detects the leading sheet which includes the identification information, the inspection apparatus discharges the leading sheet to an escape tray, and the inspection apparatus compares images of the received printed sheets with a reference image corresponding to the identification information, and thereby performs inspection of the printed sheets.

11. A printing apparatus capable of conveying sheets printed in accordance with a job to an inspection apparatus and causing the inspection apparatus to inspect the sheets using registered reference images, the printing apparatus comprising:
one or more processors that execute instructions stored in one or more memories and being configured to:
skip printing of a blank page included in the job in a case that a blank page saving function for skipping printing of a blank page is designated;
print image data of reference images on sheets in a state that the blank page saving function is not designated; and
in a case where an inspection mode for inspecting sheets by using the inspection apparatus is enabled, control to display a setting screen in which the blank page saving function is not able to be designated so that a setting of the blank page saving function in registering the reference images does not differ from a setting of the blank page saving function in the inspecting.

12. An information processing apparatus operable to control a printing apparatus and an inspection apparatus for receiving sheets printed and discharged by the printing apparatus and inspecting the sheets using registered reference images, the information processing apparatus comprising:
one or more processors that execute instructions stored in one or more memories and configured to:
input a job for printing image data of reference images to the printing apparatus and thereby cause the printing apparatus to print the image data of reference images in a state that a blank page saving function for skipping printing of a blank page is not designated;
skip printing of a blank page included in the job in a case where the blank page saving function is designated; and
control to display a setting screen in which the blank page saving function is not able to be designated in the inspecting so that a setting of the blank page saving function in registering the reference images does not differ from a setting of the blank page saving function in the inspecting when an inspection mode for inspecting printed sheets by using the inspection apparatus is designated.

13. The information processing apparatus according to claim 12, wherein the one or more processors are further configured to:
in a case where the inspection mode is enabled, control to display the setting screen in which the blank page saving function is not able to be designated.

14. A method of controlling a printing apparatus capable of conveying sheets printed in accordance with a job to an inspection apparatus and causing the inspection apparatus to inspect the sheets using registered reference images, the method comprising:
in a case where an inspection mode for inspecting the sheets by using the inspection apparatus is enabled, controlling to display a setting screen in which a blank page saving function for skipping printing of a blank page is not able to be designated so that a setting of the blank page saving function in registering the reference images does not differ from a setting of the blank page saving function in the inspecting.

15. A method of controlling an information processing apparatus operable to control a printing apparatus and an inspection apparatus for receiving sheets printed and discharged by the printing apparatus and inspecting the sheets using registered reference images, the method comprising:
inputting a job for printing image data of reference images to the printing apparatus and thereby causing the printing apparatus to print the image data of reference images in a state that a blank page saving function for skipping printing of a blank page is not designated; and
in a case where the printing apparatus has the blank page saving function, controlling to display a setting screen in which the blank page saving function is not able to be designated in the inspecting so that a setting of the blank page saving function in registering the reference images does not differ from a setting of the blank page saving function in the inspecting.

16. A non-transitory computer-readable storage medium storing a program for causing a processor to execute a method of controlling a printing apparatus capable of conveying sheets printed in accordance with a job to an inspection apparatus and causing the inspection apparatus to inspect the sheets using registered reference images, the method comprising:
in a case where an inspection mode for inspecting the sheets by using the inspection apparatus is enabled, controlling to display a setting screen in which a blank page saving function for skipping printing of a blank page is not able to be designated so that a setting of the blank page saving function in registering reference images does not differ from a setting of the blank page saving function in the inspecting.

\* \* \* \* \*